US008898793B2

(12) United States Patent
Miettinen et al.

(10) Patent No.: US 8,898,793 B2
(45) Date of Patent: Nov. 25, 2014

(54) METHOD AND APPARATUS FOR ADJUSTING CONTEXT-BASED FACTORS FOR SELECTING A SECURITY POLICY

(75) Inventors: Markus Juhani Miettinen, Saint-Sulpice (CH); Nadarajah Asokan, Espoo (FI); Aditi Gupta, West Lafayette, IN (US)

(73) Assignee: Nokia Corporation, Espoo (FI)

( * ) Notice: Subject to any disclaimer, the term of this patent is extended or adjusted under 35 U.S.C. 154(b) by 531 days.

(21) Appl. No.: 13/007,156

(22) Filed: Jan. 14, 2011

(65) Prior Publication Data

US 2012/0185910 A1 Jul. 19, 2012

(51) Int. Cl.
*G06F 21/04* (2006.01)
*G06F 21/31* (2013.01)
*G06F 21/62* (2013.01)
*H04L 29/06* (2006.01)

(52) U.S. Cl.
CPC ............ *G06F 21/31* (2013.01); *G06F 21/6245* (2013.01); *H04L 63/107* (2013.01); *G06F 21/6218* (2013.01); *G06F 2221/2111* (2013.01); *G06F 2221/2137* (2013.01); *G06F 2221/2149* (2013.01)
USPC ................................ 726/26; 726/27; 380/258

(58) Field of Classification Search
None
See application file for complete search history.

(56) References Cited

U.S. PATENT DOCUMENTS

| 6,308,273 | B1 | 10/2001 | Goertzel et al. | |
| 6,321,334 | B1 * | 11/2001 | Jerger et al. | 726/1 |
| 6,732,276 | B1 * | 5/2004 | Cofler et al. | 726/16 |
| 7,304,570 | B2 | 12/2007 | Thomas et al. | |
| 7,400,878 | B2 | 7/2008 | Hassan et al. | |
| 7,835,721 | B2 * | 11/2010 | Tuulos et al. | 455/410 |
| 2003/0105971 | A1 | 6/2003 | Angelo et al. | |
| 2003/0112182 | A1 | 6/2003 | Bajikar | |
| 2003/0140246 | A1 | 7/2003 | Kammer et al. | |
| 2004/0178883 | A1 | 9/2004 | Haselsteiner et al. | |
| 2005/0187020 | A1 | 8/2005 | Amaitis et al. | |
| 2005/0193144 | A1 | 9/2005 | Hassan et al. | |
| 2005/0221798 | A1 | 10/2005 | Sengupta et al. | |
| 2005/0239438 | A1 * | 10/2005 | Naghian | 455/410 |
| 2005/0272445 | A1 | 12/2005 | Zellner | |

(Continued)

FOREIGN PATENT DOCUMENTS

EP     1 564 973 A1    8/2005
EP     1 569 064 A1    8/2005

(Continued)

OTHER PUBLICATIONS

Office Action for related U.S. Appl. No. 12/830,990, dated Jul. 5, 2012, pp. 1-27.

(Continued)

*Primary Examiner* — Gilberto Barron, Jr.
*Assistant Examiner* — Abdulhakim Nobahar
(74) *Attorney, Agent, or Firm* — Ditthavong & Steiner, P.C.

(57) ABSTRACT

An approach is provided for selecting a security policy. A security policy manager determines one or more factors for adjusting a safety score associated with a device. The safety score is based, at least in part, on a context associated with the device. The security policy manager then processes and/or facilitates a processing of the one or more factors and the safety score to calculate an adjusted safety score, and determines to select a security policy based, at least in part, on the adjusted safety score.

18 Claims, 18 Drawing Sheets

(56) References Cited

U.S. PATENT DOCUMENTS

| | | |
|---|---|---|
| 2006/0041891 A1* | 2/2006 | Aaron ............................ 719/315 |
| 2006/0258385 A1 | 11/2006 | Hovestadt |
| 2007/0143824 A1 | 6/2007 | Shahbazi |
| 2008/0209521 A1 | 8/2008 | Malaney |
| 2008/0261616 A1 | 10/2008 | Wu |
| 2008/0318616 A1 | 12/2008 | Chipalkatti et al. |
| 2010/0048167 A1 | 2/2010 | Chow et al. |

FOREIGN PATENT DOCUMENTS

| | | |
|---|---|---|
| WO | WO 2008/110878 A2 | 9/2008 |
| WO | WO 2009/091647 A2 | 7/2009 |
| WO | WO 2009/140646 A1 | 11/2009 |
| WO | WO 2010/151860 A1 | 12/2010 |

OTHER PUBLICATIONS

U.S. Appl. No. 12/830,990, filed Jul. 6, 2010, Markus Juhani Miettinen et al.

* cited by examiner

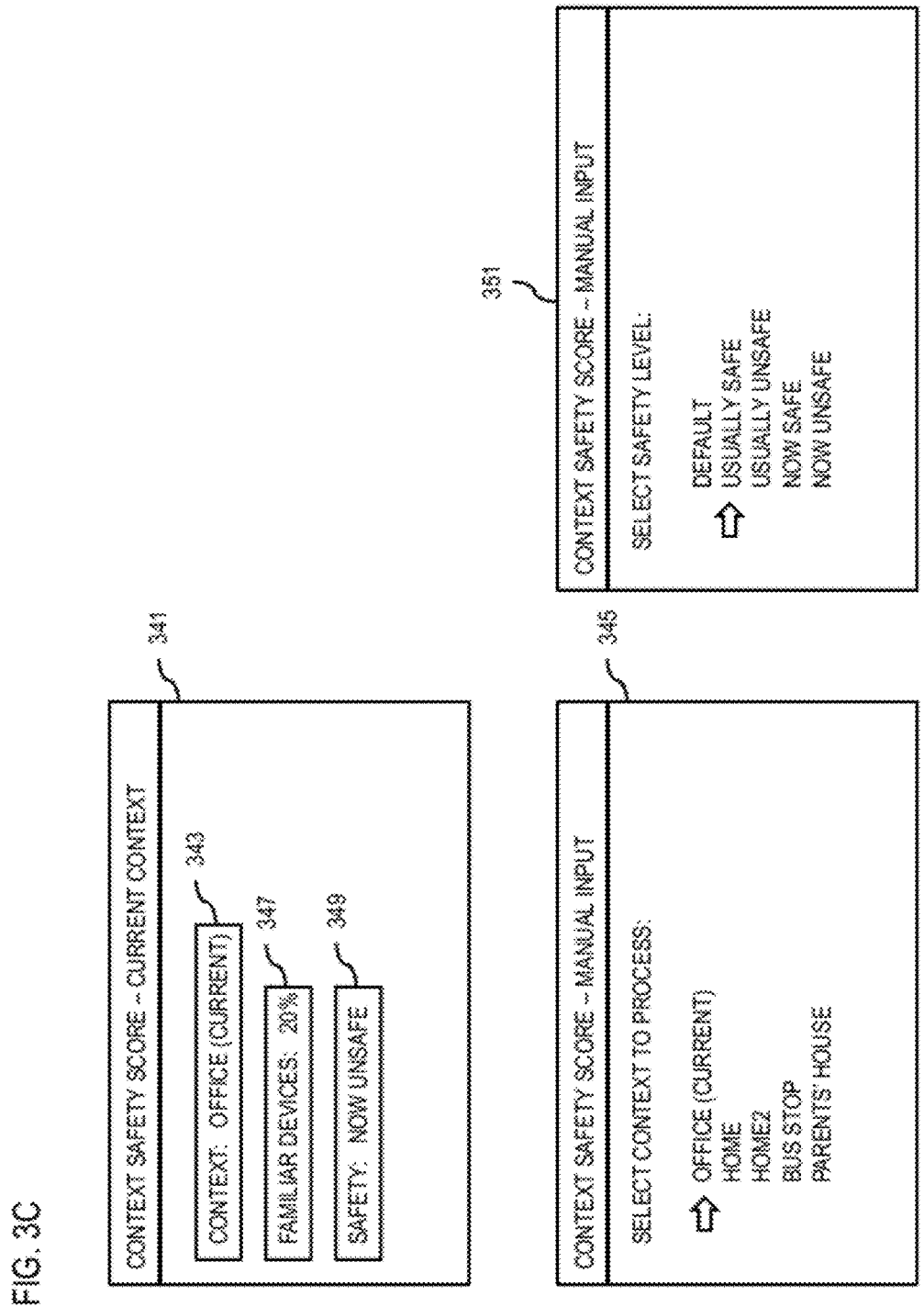

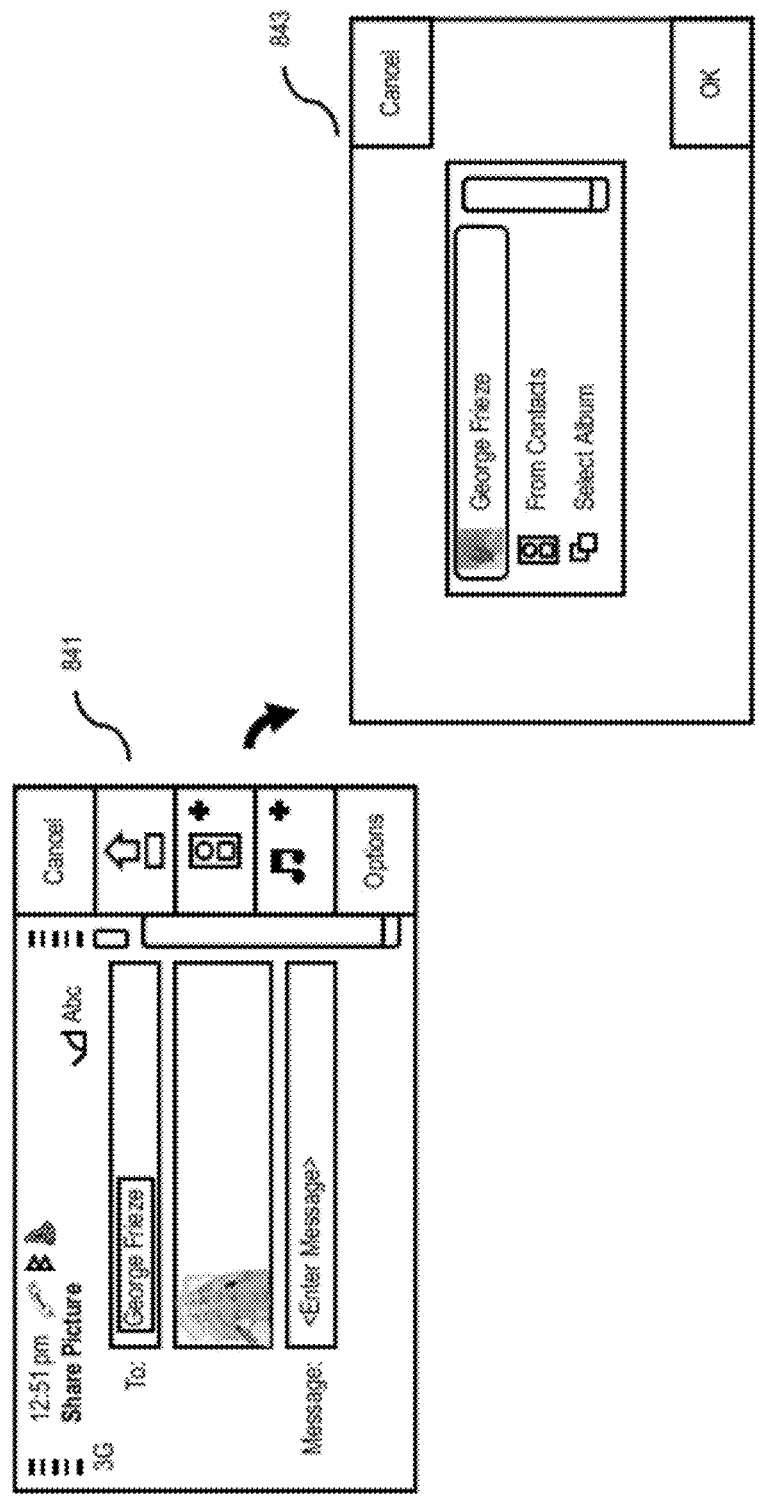

METHOD AND APPARATUS FOR ADJUSTING CONTEXT-BASED FACTORS FOR SELECTING A SECURITY POLICY

BACKGROUND

Service providers (e.g., wireless, cellular, etc.) and device manufacturers are continually challenged to deliver value and convenience to consumers by, for example, providing compelling network services. As a result, modern mobile computers and devices (e.g., smartphones, handsets, etc.) incorporate more and more functionalities, thereby merging the roles of traditional cell phones and personal computers. For example, mobile computers are not only used to make phone calls and send text messages, but they are also used for web browsing, instant messaging, creating and sharing content like photos and videos, consuming entertainment like music and television programs. Many mobile devices also support large varieties of application programs ranging from small utility applications to client applications for accessing a variety of services. Security and privacy remain important concerns, and many of these applications often ask the users to specify security and privacy policies. In addition, the relationships of a particular user to other devices and/or users may also need to be managed in terms of security and privacy policies. In this way, the number of security or privacy policies that a typical user manages can increase rapidly. Accordingly, service providers and device manufacturers face significant technical challenges to enabling users to more easily manage these policies while maintaining the appropriate level of security and/or safety within a particular contextual environment (e.g., a place with either a known or unknown geographic location).

SOME EXAMPLE EMBODIMENTS

Therefore, there is a need for an approach for efficiently selecting and managing security policies for a device.

According to one embodiment, a method comprises determining one or more factors for adjusting a safety score associated with a device. The safety score is based, at least in part, on a context associated with the device. The method also comprises processing and/or facilitating a processing of the one or more factors and the safety score to calculate an adjusted safety score. The method further comprises determining to select a security policy based, at least in part, on the adjusted safety score.

According to another embodiment, an apparatus comprising at least one processor, and at least one memory including computer program code for one or more programs, the at least one memory and the computer program code configured to, with the at least one processor, cause, at least in part, the apparatus to determine one or more factors for adjusting a safety score associated with a device. The safety score is based, at least in part, on a context associated with the device. The apparatus is also caused to process and/or facilitate a processing of the one or more factors and the safety score to calculate an adjusted safety score. The apparatus is further caused to determine to select a security policy based, at least in part, on the adjusted safety score.

According to another embodiment, a computer-readable storage medium carrying one or more sequences of one or more instructions which, when executed by one or more processors, cause, at least in part, an apparatus to determine one or more factors for adjusting a safety score associated with a device. The safety score is based, at least in part, on a context associated with the device. The apparatus is also caused to process and/or facilitate a processing of the one or more factors and the safety score to calculate an adjusted safety score. The apparatus is further caused to determine to select a security policy based, at least in part, on the adjusted safety score.

According to another embodiment, an apparatus comprises means for determining one or more factors for adjusting a safety score associated with a device. The safety score is based, at least in part, on a context associated with the device. The apparatus also comprises means for processing and/or facilitating a processing of the one or more factors and the safety score to calculate an adjusted safety score. The apparatus further comprises means for determining to select a security policy based, at least in part, on the adjusted safety score.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (including derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIGS. 3C-3E are diagrams of user interfaces used in the process of FIG. 3A, according to various embodiments;

FIGS. 8A-8C are diagrams of a sample use case for applying a security policy to share content, according to various embodiments;

DESCRIPTION OF SOME EMBODIMENTS

Examples of a method, apparatus, and computer program for selecting a security policy are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

As used herein, the term "place" refers to the semantics/usage of a location. Although a place is typically associated with a physical location, a place can also be an object that is independent of a physical or geographical location. That is, a place might change its physical location (e.g., geographic coordinates) over time such as when the place is mobile (e.g., a subway, train, airplane, etc.), and multiple places (such as a hotel and a restaurant) might be associated with the same geographic location. Thus, a place is associated temporally and spatially with a geographic location, but that geographic location need not be constant and/or known. For example, a place may refer to a user's office without specifying the specific geographic location (e.g., global positioning system (GPS) coordinates or other location coordinates). In one embodiment, a particular place is distinguished from other places by a collection of values (place metadata) for a corresponding set of attributes (place metadata) that uniquely indicate the place. In addition, it is contemplated that place may be associated with related resources that further describe the place (e.g., data such as pictures, maps, videos, personnel, products/services, menu of available products/services, amenities, etc., and other like information resources).

Although various embodiments are described with respect to context information associated with a place, it is contemplated that the context information may be related to any other context relevant to a device. By way of example, the context information may relate to a state of the device, a contextual situation (e.g., an environmental situation) of the device, a situational state, or other context of the device. In addition, the term "context" refers to a combination of the place and associated context information.

Figure 1:
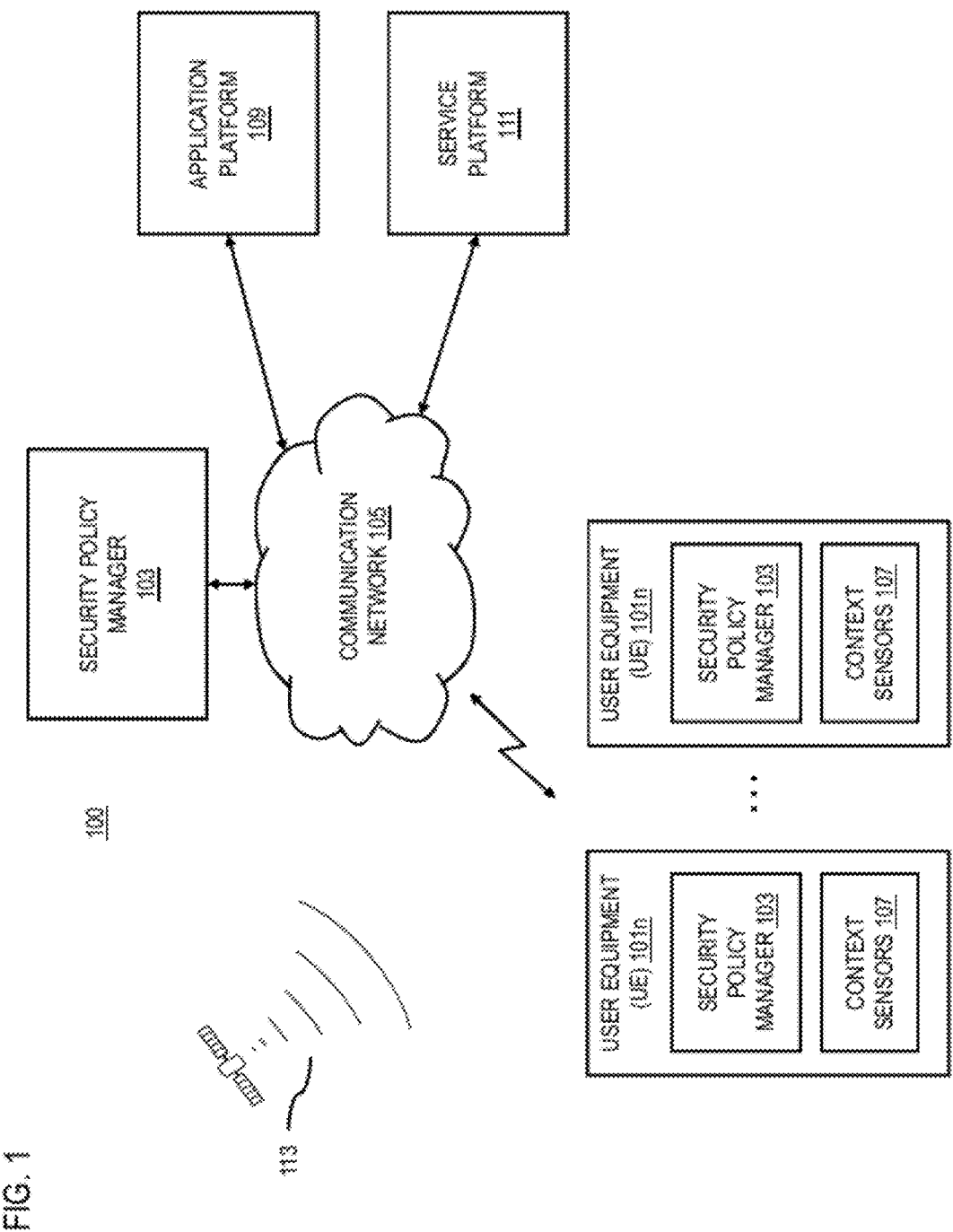
FIG. 1 is a diagram of a system capable of selecting a security policy, according to one embodiment.

FIG. 1 is a diagram of a system capable of selecting a security policy, according to one embodiment. As noted above, modern applications, services, devices, and the like often ask users to define specific security and privacy policies. This may often result in a large collection of different policies that the users have to create, modify, and maintain. As a result, the user often needs to spend considerable effort in just defining and/or maintaining such security policies. A conventional remedy for this problem often is that application designers and service providers craft a default set of policies that is applied. The users can then avoid the laborious work of setting up their own policies, but they have to accept the predefined settings, which may or may not be suitable for the individual user.

Another problem is that even if the user takes the time to create appropriate policies, it historically has been unclear whether an average user will be able to fully understand the security and privacy implications of the created policies. For example, policies are often abstract and can be quite difficult to understand even for advanced users. There also is the potential danger that the user would like to specify security and/or privacy settings in some specific way, but indeed specifies policies that are not in line with the user's intentions, because the user does not entirely understand the indirect consequences of individual policy settings.

For example, mobile devices often contain sensitive information of its user. This information can be protected by using automatic locking, which is activated after a time-out period of user inactivity has passed. The locking prohibits the use of the mobile device before the user enters the correct un-locking code into her device. The drawback with this locking is that it deteriorates the usability of the device, since the locking code is required also in situations, in which there is no immediate danger of misuse of the device. For example, the automatic lock is activated even if the mobile device is in a trustworthy environment, like e.g. at home or at the office. For this reason, many people do not use the automatic locking of the device, even though this introduces significant security risks to the user.

Another problem is the sharing of content captured with a mobile device. If a user wants to share content, in the sharing application the user typically has to explicitly specify, with which users to share the content, or, select the intended recipients of the content from a lengthy list, typically the mobile device's address book. From a usability point of view it would be very beneficial, if the mobile device could provide reasonable defaults for the sharing targets.

Another problem is that mobile devices are often used for both work-related and leisure time activities, and this mixture of roles might lead into problems. For example, it might be inappropriate to access confidential work-related documents when the user is somewhere else than at the office. By accessing confidential files in a crowded environment, confidential information may be inappropriately leaked. A way to address this problem would be to always warn the user, when the user attempts to obtain access to confidential documents, or, to require the user to enter a password before opening the document. However, this could seriously deteriorate the user experience, while the user is, for example, at the office where it generally would be acceptable to open and work with even confidential files. A slightly related problem might also be that the user might accidentally open content ("Not safe for work"—content) at work or other environment where such content is not appropriate.

Finally, another problem is also that defining reasonable groups of people that would be appropriate for sharing content at specific place (e.g., home or office) and/or contextual situations (e.g., for work or leisure) is currently a very tedious task. For example, a user might want to define at work a group 'colleagues' to share work-related content with them, or, define a group 'family' at home to share private content with. Each of the persons in the group typically is separately entered into the address book of the mobile device, a, group would need to be created, and each person is added to the appropriate group. There would clearly be a need for making this group creation process less laborious for the user.

To address these problems, the system 100 of FIG. 1 introduces the capability to easily and automatically define and/or maintain security policies based on context information associated with a particular place or context in which a device is operating such as "Home", "Work", "Bus Stop", etc. More specifically, the system 100 assesses the security sensitivity at the place based on context information and then adapts security policies and/or settings based on sensed environment as determined from context information. This context information can be used to evaluate and determine a safety score for the place or context. The safety score can then be used to select an appropriate security policy based on the context. In other words, when considering the regular use of a mobile device in day-to-day life, there can be clear differences in the perceived safety of places and/or situations related to the places. For example, a user may be inclined to believe that is "safer" to use a mobile device in an enclosed, trustworthy environment like, e.g., at a corporate office than it would be to be using the device at a crowded street corner during rush hour. In addition, an intuitive understanding would be that the likelihood for someone, e.g., stealing the mobile device and/or misusing the device is higher at the street corner than in the office, where access is limited to corporate personnel and where the user is typically surrounded by well-known and trusted persons.

In one embodiment, the system 100 enables the determination of one or more factors (e.g., manually input or automatically determined factors) for adjusting a calculated safety score. In this way, the system 100 can potentially produce a more applicable safety score for selecting a security policy based, at least in part, on the amount of information available for calculating the score, perceived experiences of users of the participating devices, temporal changes in the contextual environment, and the like. For example, in one embodiment, the safety score is based, at least in part, the familiarity and/or trustworthiness of other devices operating within a given context or place. However, it can take some time to collect sufficient context information to determine whether these devices are "familiar" or "trustworthy". During this data collection or learning process, user experience can be negatively affected because even a very familiar device for a particular user is treated as an unfamiliar device until the data collection reaches a sufficient level. Accordingly, in one embodiment, the system 100 enables manual input from the user for specifying one or more factors (e.g., familiarity parameters, trust parameters, etc.) associated with the device to augment available data for calculating a safety score. In this way, the system 100 can discriminate between familiar and unfamiliar devices within a context to improve accuracy of the safety score when available context information is incomplete or otherwise limited.

In another embodiment, the system 100 can automatically determine factors for adjusting (e.g., either increasing or decreasing) the safety score and/or parameters (e.g., familiarity parameters, trust parameters) for calculating the safety score based, at least in part, on temporal considerations. It is noted that characteristics of a particular context and/or the devices within the context often are often dynamic. For example, in one embodiment, a device becomes more familiar or trustworthy if it has been observed for some predetermined amount of times or if it has been observed within a predetermined period of time. Similarly, a device becomes less familiar or trustworthy if it has not been observed to occur within the context for some period of time. Accordingly, the system 100 can apply factors to adjust the safety score and/or the parameters for calculating the safety score based on temporal occurrence information (e.g., decay familiarity parameters for less observed devices over time, or boost familiarity parameters for increased occurrence of devices within the context; or boost the familiarity parameters if, for instance, the user indicates that a context is "safe" and the device is observed in the context at the same time).

As shown in FIG. 1, the system 100 comprises user equipment (UE) 101a-101n (also collectively referred to as UE 101) having connectivity to a security policy manager 103 via a communication network 105. In certain embodiments, the security policy manager 103 may operate as an independent component of the network 105. In addition or alternatively, all or a portion of the functions of the security policy manager may be incorporated in or executed by the UE 101.

In one embodiment, the security policy manager 103 draws from different sources (e.g., context sensors 107 of the UE 101, application platform 109, service platform 111, input from participating users, etc.) of context information to measure, for instance, the familiarity and trustworthiness of individual devices or context parameters in the UE 101's context (e.g., a place and/or related contextual situation) as well as the context information in general to determine an overall safety score. In another embodiment, the security policy manager 103 may monitor and collect data on multiple instances of the context information to capture temporal changes. The security policy manager 103 can then determine both instantaneous and aggregated safety scores to dynamically change the safety score and resulting security policies over time. For example, context information may include location information, detected devices (e.g., via Bluetooth and/or WLAN), camera information, microphone information, environmental sensor information, weather information, user calendar information, accelerometer information, compass information, body temperature information, etc. In one embodiment, context information may be collected by individual UEs 101 via context sensors 107. In certain embodiments, a UE 101 can utilize sensors such as a global positioning system (GPS) to access GPS satellites 113 to determine context information (e.g., the location of the user). Further, the UE 101 may query one or more other applications (e.g., a calendar application) of the application platform 109 or services of the service platform 111 to retrieve context information. In addition, each UE 101a-101n in the system 100 may transmit context information associated with the user of each respective UE 101a-101n to the other UEs 101, the security policy manager 103, and the like. In another embodiment, the context information (e.g., familiarity parameters, trust parameters) may be received based, at least in part, on input from the user of each UE 101a-101n.

As used herein, the term "safety score" represents a value assigned to a given context, situation, and/or place that represents a perceived or sensed level of security risk associated with the context, situation, or place. By way of example, one component of the safety score represents the predictability of the environment or place. In places that a user could consider safe (e.g., a user's home or office), the environment is often very predictable. For example, the user is typically surrounded by a limited number of familiar persons in a familiar location, and it is unlikely that an external attacker would threaten the safety of the situation. In places that are not considered safe, these characteristics usually do not apply. In such places, the location itself may be familiar, but the user may encounter many strangers and there might be many different people coming and going through the vicinity of the place.

The system 100 can then use the safety score to select and/or make security policy decisions. For example, in one embodiment, the system 100 can use the safety score to select a security policy for selecting a device locking mechanism for the UE 101. The system 100 can also use the score to configure the locking mechanism (e.g., specify the time-out period to be used). By way of example, an easy locking-mechanism (e.g., a simple swipe or gesture) and long time-outs can be used in contexts or locations that have high safety scores. Correspondingly, a strong locking mechanism (e.g., complex passwords) and a short-time out period can be used in a context or location with a low safety score.

In another embodiment, the system 100 can use the safety score and/or corresponding security policy to select default persons or devices for sharing content (e.g., photos, videos, etc.). For example, when content like pictures or videos are captured or create at the UE 101, a default list of other users or devices to share the content with can be created based, at least in part, on the context information, safety score, security policy or a combination thereof. This default list could be used later, if the user decides to share the content, or the sharing could be automatic. The default list of persons would be compiled at or shortly after the time of content creation by examining the devices in the user's context (e.g., within Bluetooth and WLAN range). If familiar devices are detected, the owners of those devices could be added to the list of default sharing targets. If groups of persons have been defined for the user, also the groups of persons that these persons belong to, could be added to the list of default sharing targets.

In another embodiment, the system 100 can restrict or otherwise determine access to content, applications, functions, features, and the like of the UE 101 based, at least in part, on the safety score (e.g., reflecting the context information, familiarity of the surroundings, etc.). By way of example, if content metadata identifies the content (e.g., a document) to be confidential, the access to this content may be restricted in contexts that are considered unsafe (e.g., a safety score below a predetermined threshold value). In some embodiments, depending on the safety level of the context, the system 100 may generate an alert and the user may be warned before accessing confidential content, or, the user may be required to authenticate again before the content is opened, or, the content may be displayed differently, making it more difficult for others than the device user to read the content. For example, the colors may be changed or the font of the display may be made smaller, or other technology may be employed to improve reading privacy of the content.

In yet another embodiment, the system 100 can automatically form groups for the UE 101 based, at least in part, on the context information, safety score, security policy, or a combination thereof. For example, the context information can include the occurrence frequency of the UE 101, other UEs 101, other users, etc. at specific locations (e.g., point-of-interest (POI) locations). By way of example, this could be done by first identifying familiar contexts, i.e., over time observing, which contexts the user visits often. The context can be defined as the set of familiar WLAN access points, cell IDs and the GPS location or the location information obtained through some other positioning technology, or a subset of these. For each identified familiar context or location, the set of Bluetooth devices present at different points of time would be monitored and their occurrence frequencies recorded. Over time, sets of Bluetooth devices occurring often (e.g., more often than a specified frequency threshold) in the familiar context could be identified. After that, groups of users could be formed by adding the owners of these frequently occurring Bluetooth devices to a user group which would be typical for the specific familiar context.

In another embodiment, the system 100 generates the safety score and applies the resulting security policy(ies) to a group of UEs 101. In other words, a group of UEs 101 may form to share observed context information for calculating a safety score for the entire group. For example, colleagues in a work context or place, may share observed familiarity or trust information.

In another embodiment, the system 100 may generate the safety score and determine the applicable security at different levels of granularity within a particular UE 101 itself. For example, safety scores and policies may be determined and specified on an application specific basis whereby one application (e.g., a work email application) and another application (e.g., a personal email application) may operate under different security policies and safety scores. In another embodiment, the system 100 may limit or restrict access to particular applications and/or UI elements (e.g., home screen icons, widgets, etc.) of the applications on an individual or group basis.

By way of example, the communication network 105 of system 100 includes one or more networks such as a data network (not shown), a wireless network (not shown), a telephony network (not shown), or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

The UE 101 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, Personal Digital Assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 101 can support any type of interface to the user (such as "wearable" circuitry, etc.).

By way of example, the UEs 101, the security policy manager 103, the application platform 109, and the service platform 111 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application headers (layer 5, layer 6 and layer 7) as defined by the OSI Reference Model.

Figure 2:
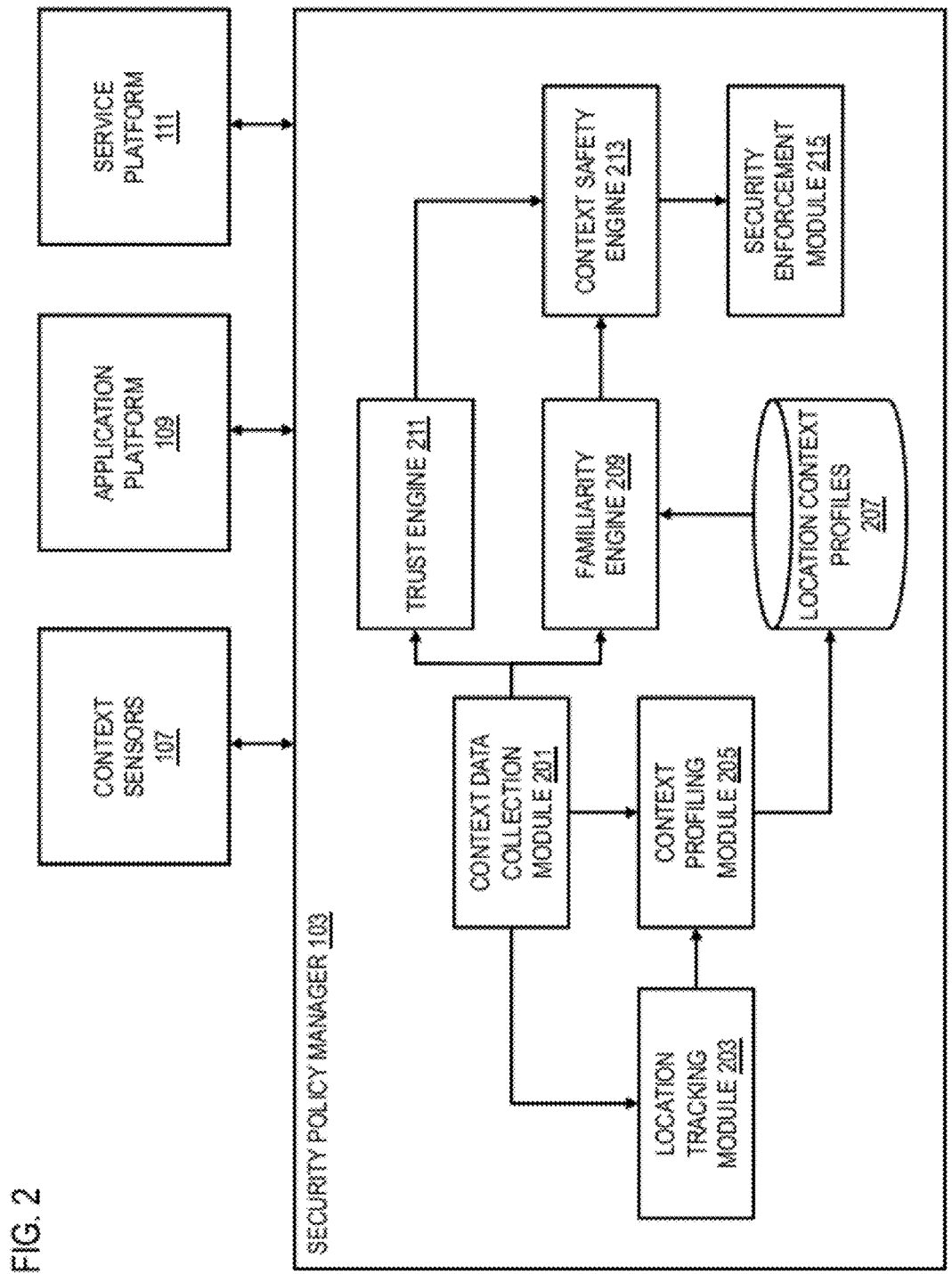
FIG. 2 is a diagram of the components of a security policy manager, according to one embodiment.

FIG. 2 is a diagram of the components of a security policy manager, according to one embodiment. It is contemplated that the functions of these components may be combined in one or more components or performed by other components of equivalent functionality. In this embodiment, the security policy manager 103 includes: (1) a context data collection module 201 for monitoring context information associated with a given context or location (e.g., a POI); (2) a location tracking module 203 for following the movements of the UE 101 and identifying places and/or POIs frequented by the UE 101; (3) a context profiling module 205 for accumulating a context history associated with places, contexts, and/or POIs identified by the location tracking module 203; (4) a database 207 of location context profiles generated by the context profiling module 205; (5) a context familiarity engine 209 for evaluating the familiarity of a given context or location; (6) a trust engine 211 for evaluating the trustworthiness of individual UEs 101, context parameters, parameter values, etc. and assigning trustworthiness weights to them; (7) a context safety engine 213 for determining the safety score of the places, contexts (e.g., including classes of context information), and/or POIs identified by the location tracking module 203; and (8) a security enforcement module 215 for selecting and enforcing a security policy for the determined location, context, etc.

More specifically, the context data collection module 201 periodically monitors the radio environment of the mobile device and other context parameters and information like, e.g. GPS location. The context data collection module 201 provides periodic updates of such parameters that can be used for positioning the device to the location tracking component. By way of example, such parameters include, e.g., GPS location, WLAN access points in range and their strengths, and, cellular network cell ID information. The context data collection module 201 also provides the context parameter values to the context profiling module 205 and the context safety engine 213. In some embodiment, available metadata about, e.g. the source of the data, is attached to the actual context data by the context data collection module 201.

The location tracking module 203 monitors the movements of the UE 101 based on the location-related context data it receives from the context data collection module 201 and identifies locations, contexts, and/or points of interest for the user. By way of example, points of interest are defined as locations the user visits frequently, or, locations that the user spends a lot of time in. The location tracking module 203 provides the points of interest it detects as input to the context profiling module 205.

The context profiling module 205 accumulates context profiles for identified points of interest. Whenever the UE 101 is at a point of interest or other place, the context profiling module 205 records the current values of the context parameters and updates the profile based on them. In one embodiment, the profile contains a list of all observed context parameter values and their occurrence frequencies and possible other statistical data about their occurrence history. In addition or alternatively, the profile can contain context parameters manually specified by the user or other observer of the context. The context profiling module 205 may also accumulate a global profile for all observed context parameter values. The global profile would record all observed context parameter values and their occurrence frequencies and possible other statistical data about their occurrence history. In one embodiment, the context profiles are stored in the location context profiles database 207.

The context familiarity engine 209 calculates familiarity scores for individual current context parameter values (e.g. for individual Bluetooth devices, WLAN APs and GSM cell IDs) and context parameter classes (e.g., Bluetooth environment, WLAN environment, GSM cell environment) while the user is at a point of interest. By way of example, the context familiarity engine 209 uses as input the context profiles generated by the context profiling module 205 and the current context parameter values.

In one embodiment, the familiarity score for individual context parameter values is calculated as follows. Each context parameter value (e.g., the MAC address of a Bluetooth device, or, a WLAN AP MAC address) is compared to the context profile of the current point of interest. Each context value that cannot be found in the profile (i.e., which has not been observed earlier) or for which the recorded occurrence frequency is below a determined threshold freq_unknown, gets a familiarity score of zero. For values for which the observed frequency is above freq_unknown, the familiarity score is a function of the recorded occurrence frequency.

By way of example, for context parameter classes, the familiarity score is calculated as a function of the familiarity scores of all parameter values falling into that class at the current point of interest. For example, the familiarity score for the Bluetooth environment is a function of the familiarity scores of all Bluetooth-related context parameter values, e.g. the familiarity scores of all Bluetooth MAC addresses observed at the current point of interest.

The function can be, e.g. the relation of known context parameter values having a familiarity score above a certain threshold to unknown context parameter values having a familiarity score below a certain (possibly different) threshold. The function can also be, e.g., the average of all familiarity scores, or, it can be any other statistical measure describing the distribution of the familiarity scores of context parameter values in the particular class.

The trust engine 211 monitors the context values provided by the context data collection module 201 and assigns a trustworthiness weight for each context parameter class or context parameter value. By way of example, the trustworthiness weight may be a function of the strength of authentication of the source of the parameter value. That is, if the source has been authenticated strongly, the trustworthiness weight gets a high value. If the authentication is less strong, the trustworthiness weight gets a medium value. If there is no authentication, the trustworthiness weight gets, for instance, the lowest default value. For example, if the source of context parameter values is a WLAN access point that has been authenticated, the trustworthiness weights of context parameter values related to the WLAN access point may receive higher values than the default weight.

In certain embodiments, the trust engine 211 may also take as input trust values provided by a trust management system. By way of example, a trust management system independently collects data on trust for any of the UEs 101s, POIs, context parameters, or other components or modules of the system 100. Based on the trust values, the trust engine 211 can adjust the trustworthiness weights of context parameter classes or parameter values based on the trust value that the source of the context parameter values has, or, based on the trust value that a target object identified by a context parameter value has. For example, a context parameter value (e.g., a Bluetooth MAC address) identifying a device with a high trust value (e.g., the handset of a friend) may be assigned a higher trustworthiness weight based on the trust value provided by the trust management system. Similarly, trustworthiness weights for context parameter values originating from a source with a very low trust value may be decreased. For example, context parameter values related to a WLAN base station with a very low trust value (e.g. a public, unreliable hotspot) may receive a lower trustworthiness weight than what by default would be assigned to a WLAN base station.

The trust engine 211 may also assign trustworthiness values to entire context parameter classes (e.g., Bluetooth environment, WLAN environment, GSM cell environment). The trustworthiness weight for each parameter class can be a function of the trustworthiness weights of context parameter values falling within each class. The function can be defined as a ratio of the amount of high trustworthiness weights and the amount of low trustworthiness weights, or, it can be the average trustworthiness weight inside the class, or, it can be any other statistical feature describing the distribution of trustworthiness weights inside the class.

In one embodiment, the context safety engine 213 takes input from both the context familiarity engine 209 and the trust engine 211. The context safety engine 213 processes the familiarity scores and trustworthiness weights of the context parameter values and context parameter classes and calculates a safety score for the current context. For example, the safety score is a measure of the hostility or risk (e.g., security and/or privacy risk) of the current context or location. In another embodiment, the context safety engine 213 may filter the context parameter values and context parameter classes it processes based on their associated familiarity scores and trustworthiness weights. In yet another embodiment, the context safety engine 213 may weight the familiarity scores with the trustworthiness weights so as to give more emphasis for very familiar and highly trustworthy context parameters and parameter values, yielding a trust-familiarity score for each context parameter value and class.

In one embodiment, the safety score for the current context is calculated as a function of the current trust-familiarity scores, taking into account the trustworthiness weights as described above. The function may be defined as the ratio between the amounts of context parameter values with high trust-familiarity scores and low trust-familiarity scores, or, it can be the average of the trust-familiarity scores, or, it can be any other statistical measure describing the distribution of trust-familiarity scores of context parameter values and classes in the current context.

In another embodiment of the invention, the context safety engine 213 need not output only one safety score, but it may provide different safety scores for different properties of the environment. For example, the context safety engine 213 may provide separate safety scores for the Bluetooth environment and for the WLAN environment, or, separate safety scores for 'physical safety' (e.g., susceptibility for device theft), 'communications safety' (e.g., susceptibility to attacks via the radio environment) and 'environmental safety' (e.g., susceptibility to damage or harm to the user (or the device) due to environmental factors like, e.g., rain, noise, pollution, toxic gasses, etc.). In addition, the context safety engine 213 may provide safety scores for different time instances or aggregations of one or more of the time instances to capture temporal variations. In one embodiment, the context safety engine 213 can adjust (e.g., boost, decrease, decay) the safety scores or safety score parameters based on temporal observations of multiple instances of the context information and/or manual input from a user.

In yet another embodiment, the safety score of the current context is processed by the security enforcement module 215. The security enforcement module 215 selects and/or implements the security policies and makes decisions accordingly. For example, with respect to the locking mechanism use case described previously, the security enforcement module 215 adjusts the selection of the locking scheme, the time-out values and the depth of locking to be applied to the device locking based on the safety score. In certain embodiments, the security enforcement module 215 can restrict the local access to specific content based on the safety score.

With respect to policy decisions with respect to content sharing as described above, the security enforcement module 215 compares the current context parameter values (specifically the Bluetooth devices in the context) to the global profile accumulated by the context profiling component to make appropriate decisions. Any devices in the context that would have a recorded occurrence frequency in the global profile above a specified frequency threshold would be considered 'familiar' and would be added to the list of default sharing targets.

With respect to group formation, the security enforcement module 215 examines the context profile of a specific point-of-interest accumulated by the context profiling component. All context parameter values (specifically Bluetooth devices) whose occurrence frequency would exceed a specified threshold would be considered frequently occurring at the specific point-of-interest and would be added to the group of devices (and thereby persons) typical for that point-of-interest. This group could then be used as a group for sharing or specifying access rights at that point-of-interest.

Figure 3A:
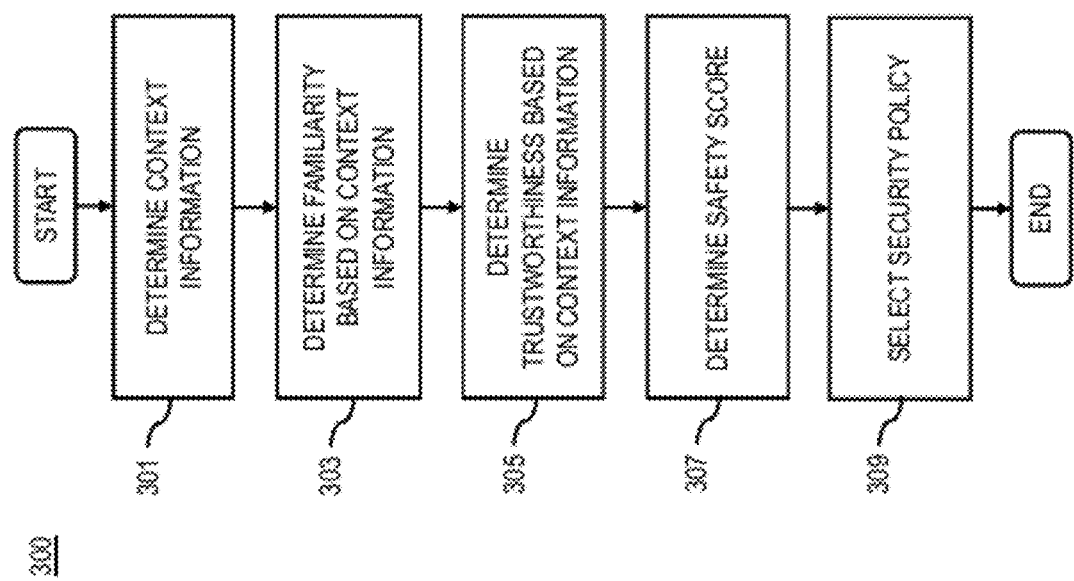
FIG. 3A is a flowchart of a process for selecting a security policy by determining a safety score, according to one embodiment.
Figure 11:
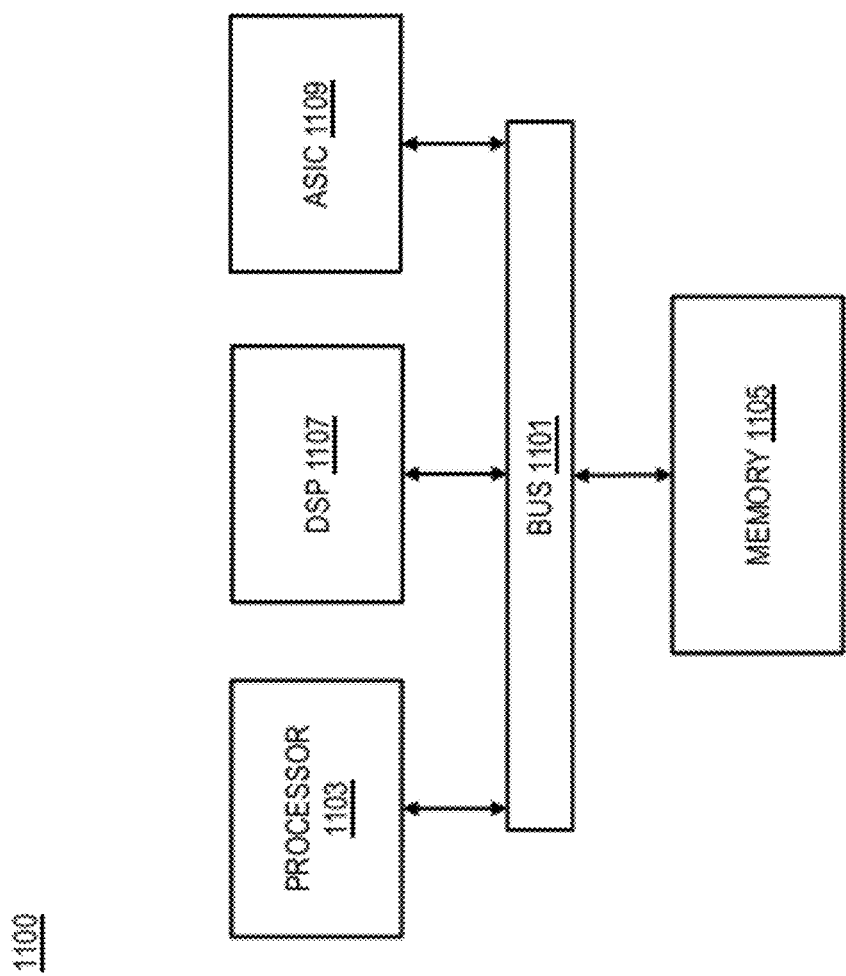
FIG. 11 is a diagram of a chip set that can be used to implement an embodiment of the invention.

FIG. 3A is a flowchart of an overall system process for selecting a security policy by determining a safety score, according to one embodiment. In one embodiment, the security policy manager 103 performs the process 300 and is implemented in, for instance, a chip set including a processor and a memory as shown in FIG. 11. As such, the security policy manager 103 provides means for accomplishing various parts of the process 300 as well as means for accomplishing other processes in conjunction with other components of the system 100. In step 301, the security policy manager 103 determines context information with respect to a UE 101 associated with a place (e.g., a POI). An example of contextual sources of information is the radio environment sensed by the device (i.e., WLAN, Bluetooth devices, and cellular access points in the vicinity).

In one embodiment, the context information includes one or more parameters related to familiarity, trustworthiness, or a combination thereof of at least one of the place, the device, a user of the device, one or more other devices within proximity of the place, and respective other users of the one or more other devices. Accordingly, the security policy manager can determine the safety score to include components of familiarity, trustworthiness, or a combination thereof. In step 303, the security policy manager 103 determines familiarity based, at least in part, on the context information. Similarly, in step 305, the security policy manager 103 determines trustworthiness based, at least in part, on the context information.

More specifically, the familiarity is augmented with trust-enhancing measures associated to the context parameter values to provide a safety measure for the current context. In one embodiment, the familiarity of the context is calculated by comparing the values of the current context parameters (i.e. WLAN APs, Bluetooth device MAC addresses, cellular network cell IDs, etc.) to the context parameter profile for the current point of interest. The profile is a statistical model, which records, what context parameter values have been observed at a specific point of interest earlier and how often. The basic principle is that if the current context parameter values have been observed often earlier, the familiarity score is increased. Similarly, if some of the context parameters have never or only seldom been observed earlier, the familiarity score is decreased.

In one embodiment, to measure in concrete terms the familiarity of the context $c_t$ of the UE 101 at a specific point of time t, the security policy manager 103 accumulates an observation history $H_{context} = \{o_1, o_2, \ldots, o_n\}$ of the device's context in which, the manager 103 records the observations $o_w$ of other devices d in the context or location during the time window w, $$o_w = \{d | \exists c_t : d \in c_t \land t \in w\}$$

Based on the observation history, the security policy manager 103 distinguishes between familiar devices and unfamiliar devices. In one embodiment, by default, devices are considered to be unfamiliar devices unless their familiarity scores $dfam_{context}(d)$ have a higher value than a specified threshold familiarity_thr. Initially, the security policy manager 103 defines the familiarity score of a device d as the number of observations of the device in the context history $H_{context}$:

$$dfam_{context}(d) = \|\{o \in H_{context} | d \in o\}\|$$

In one embodiment, the context familiarity cfamcontext (ct) of a device's context ct at a point of time t is defined as the relative amount of familiar devices in the context:

$$cfam_{context}(c_t) = \frac{\|\{d \in c_t | dfam_{context}(d) \geq \text{familiarity\_thr}\}\|}{\|\{d | d \in c_t\}\|}$$

In another embodiment, to supplement the determined familiarity values, individual context parameter classes or context parameter values observed may be given additional weights by evaluating the trustworthiness of the source for the parameter. If the source of the parameter can be authenticated, a high trustworthiness weight may be assigned to values originating from this source or associated with this source.

Similarly, if a trust management system is employed for managing trust to other users, devices or services, then the trust value provided by the trust management system can be used to determine the trustworthiness weight for context parameters related to them. For example, the trustworthiness weight for a user device's Bluetooth MAC address may be determined based on the trust value for the user provided by the trust management system.

Next, the security policy manager 103 determines a safety score associated with the place based, at least in part, on the context information (step 307) and selects an appropriate security policy or makes a security policy decision based, at least in part, on the safety score (step 309). Several security policies and related decisions are discussed below with respect to FIGS. 4-9.

Figure 3B:
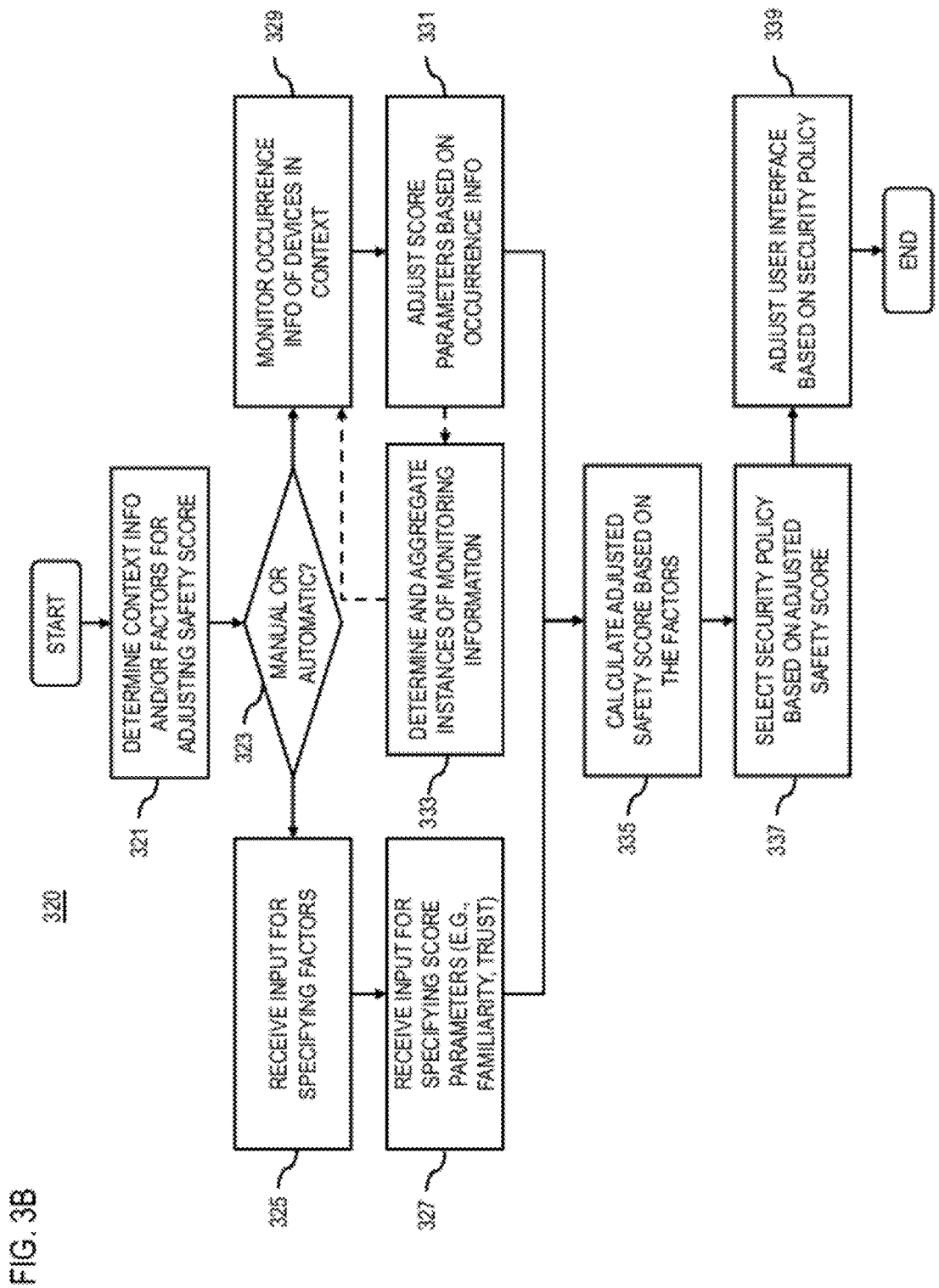
FIG. 3B is a flowchart of a process for adjusting a safety score, according to one embodiment.

FIG. 3B is a flowchart of a process for adjusting a safety score, according to one embodiment. In one embodiment, the security policy manager 103 performs the process 320 and is implemented in, for instance, a chip set including a processor and a memory as shown in FIG. 11. As such, the security policy manager 103 provides means for accomplishing various parts of the process 320 as well as means for accomplishing other processes in conjunction with other components of the system 100. In step 321, the security policy manager 103 determines one or more factors for adjusting a safety score associated with a device, wherein the safety score is calculated based, at least in part, on a context associated with the device according to the process of FIG. 3A. In one embodiment, the factors provide: (1) a means to accelerate learning of the familiarity parameters and/or trust parameters of a device for determining a safety score, (2) a means to receive direct guidance from a user on the familiarity and trust parameters of devices and/or contexts, and (3) means for adjusting (e.g., boosting or decaying) the familiarity and trust parameters over time (e.g., so that only recently observed devices remain familiar and/or trusted).

In step 323, the security policy manager 103 determines or otherwise obtains the adjustment factors by manual input or automatic sensing. In one embodiment, the security policy manager 103 receives an input for specifying one or more of the factors (step 325). For example, the security policy manager 103 can receive an input for specifying a perceived safety level of a context. The specified safety level represents at least one of the factors for calculating and/or adjusting the safety score. The input of the perceive safety level enables, for instance, the security policy manager to leverage the experience of a user who might have the best opportunity to estimate the safety level of a specific context when other context information is incomplete or unavailable for computing an accurate safety score.

In step 327, the security policy manager 103 can receive direct input for specifying one or more parameters (e.g., familiarity parameters, trust parameters) for adjusting (e.g., boosting, throttling, or decaying) a safety score. For example, when a user is at a context C and the current observation of the context is $C_i$, the user may want to decide that the devices present in the context at that time are 'familiar' or 'trustworthy', and the user can adjust their familiarity or trust values/parameters by manually activating a adjustment functionality on the end-user device (e.g., a UE 101). This functionality then adjusts the familiarity or trust values of all devices $d_k$ in the context $C_i$ as follows:

For all $d_k$ such that $d_k \in C_i$:

$$fam_i(d_k)=fam_{i-1}(d_k)\cdot(1-\gamma)+\gamma, \text{ where } \gamma \text{ is a suitably chosen boosting parameter, e.g. } \gamma=0.7$$

In cases where the devices in the context are deemed untrustworthy, the user may decide to "throttle" or "de-boost" the familiarity of the devices $d_k$ in the Context $C_i$ as follows:

For all $d_k$ such that $d_k \in C_i$:

$$fam_i(d_k)=fam_{i-1}(d_k)\cdot(1-\gamma), \text{ where } \gamma \text{ is a suitably chosen throttling parameter, e.g. } \gamma=0.7$$

In another embodiment, the throttling can also be done by setting the familiarity values of the devices to some predefined constant low value, e.g.:

For all $d_k$ such that $d_k \in C_i$:

$$fam_i(d_k)=\gamma, \text{ where } \gamma \text{ is a suitably chosen value, e.g. } \gamma=0.$$

Returning to step 323, if the security policy manager 103 determines one or more of the adjustment factors automatically, the security policy manager 103 then determines to cause, at least in part, monitoring of occurrence information for the one or more other devices within the context, wherein the occurrence information representing at least one of the factors (step 329). In step 331, the security policy manager 103 processes and/or facilitates a processing of the occurrence information to adjust the one or more familiarity parameters, the one or more trust parameters, the adjusted safety score, or a combination thereof.

In one embodiment, the adjustment of the one or more familiarity parameters, the one or more trust parameters, the adjusted safety score, or a combination thereof is a reduction if there is decreased occurrence information with respect to at least one of the one or more other devices. In another embodiment, the adjustment of the one or more familiarity parameters, the one or more trust parameters, the adjusted safety score, or a combination thereof is an increase if there is increased occurrence information with respect to at least one of the one or more other devices.

In step 333, the security policy manager 103 can optionally determine and aggregate different temporal instances of the context information or score parameters. In one embodiment, the score parameters, the one or more factors, the safety score, the adjusted safety score, or a combination thereof are based, at least in part, on an instant observation or an aggregate observation of the context. For example, for each observed device d, a device familiarity value can be calculated. The initial value for the familiarity value is 0, i.e. $fam_0(d)=0$.

When a device is observed in the context, its familiarity value is increased. If the device is not seen in a sequence of n observations of the context, the familiarity value of the device is decreased. In one embodiment, the aggregation of the familiarity value $fam_i(d)$ of a device d at the ith observation $C_i$ of context C can be done as follows:

$$fam_i(d)=fam_{i-1}(d)\cdot(1-\alpha)+\alpha, \text{ if } d \in C_i,$$

$$fam_i(d)=fam_{i-1}(d), \text{ if } d \notin C_i, \text{ where } \alpha \text{ is a suitably chosen parameter, e.g. } \alpha=0.2$$

In another embodiment of the invention, the above methodology could be applied to trustworthiness values of principals (e.g. users or devices). Initially, the trustworthiness value trw(p) of a principal p would be 0, i.e. $trw_0(p)=0$.

Trustworthiness values would be updated at specific increments i. Each increment may represent a time window, a specific event, a specific situation, an interaction, or any other meaningful decision point at which trustworthiness values can be updated.

At each increment i, the trustworthiness value would be increased, if there is a trustworthiness indication in favor of principal p related to increment i, i.e. $trw\_ind_i(p)=1$:

For all p such that $trw\_ind_i(p)=1$:

$$trw_i(p)=trw_{i-1}(p)\cdot(1-\alpha)+\alpha, \text{ where } \alpha \text{ is a suitably chosen aggregation parameter.}$$

In one embodiment, the security policy manager 103 can then make adjustments to the score parameters. For example, for each nth observation of context C also a decay formula may be applied:

For all i such that i mod n=0: if $d \notin \{C_{i-n+1} \cup C_{i-n+2} \cup \ldots \cup C_i\}$:

$$fam_i(d)=fam_i(d)\cdot(1-\beta), \text{ where } \beta \text{ is a suitably chosen decay parameter.}$$

Similarly for trust parameters, At each nth increment i, also a decay formula may be applied:

For all i, p such that: i mod n=0: if $\forall j \in \{i-n+1, i-n+2, \ldots, n\}: trw\_ind_j(p)=0$:

$$trw\_ind_i(p)=trw\_ind_i(p)\cdot(1-\beta), \text{ where } \beta \text{ is a suitably chosen decay parameter, e.g. } \beta=0.8$$

This means that the decay would be applied at increment i, if there are no positive trustworthiness indications in favour of the principal p during the last n increments.

In one embodiment, adjustments to boost or increase the score parameters based on the monitored context information may be performed as described with respect to step 327 above.

In step 335, the security policy manager 103 processes and/or facilitates a processing of the one or more factors and the safety score to calculate an adjusted safety score. For example, based on the individual device familiarity measures $dfam_{C_i}(d_k)$, a context familiarity measure can be calculated for each context observation $C_i$, which is aggregated based on the familiarity scores of the devices in $C_i$. It can be, e.g. the average of the device familiarity values, or some other function of these values. This context familiarity value is called the instant context familiarity $cfam_{inst}(C_i)$. Trust parameters may be calculated in a similar method.

Based on a sequence of instant context familiarity values, an aggregate context familiarity can be calculated. It is an aggregate function of the $cfam_{inst}(C_i)$ values. In one embodiment, the aggregate context familiarity can be defined as follows:

$$cfam_{agg}(C_i)=cfam_{agg}(C_{i-1})\cdot(1-\alpha)+cfam_{inst}(C_i)\cdot\alpha,$$
where $\alpha$ is a suitably chosen decay parameter,
e.g. $\alpha$=0.2.

The instant and aggregate context familiarity values can be used to calculate and/or adjust a safety score. In one embodiment, the safety score can define a four-level context safety classification. The context safety class attached to a context observation $C_i$ is a function of the $cfam_{agg}(C_i)$ and $cfam_{inst}(C_i)$. In one embodiment of the invention, the context safety mapping has been defined as follows in Table 1:

TABLE 1

| Safety level | Color code | $cfam_{inst}(C_i)$ | $cfam_{agg}(C_i)$ |
|---|---|---|---|
| "usually safe" | Green | >$\alpha$ | >$\beta$ |
| "now safe" | Blue | >$\alpha$ | <$\beta$ |
| "now unsafe" | Yellow | <$\alpha$ | >$\beta$ |
| "usually unsafe" | Red | <$\alpha$ | <$\beta$ |

Where $\alpha$ and $\beta$ are suitably chosen threshold parameters.

In step 337, the security policy manager 103 then selects a security policy based on the adjusted safety score as described with respect to FIG. 3A above. In embodiment, it is also possible to adapt and use familiarity/safety scores in finer-grained scopes within the system 100 (e.g., among different applications executing on the UE 101). For example, the security policy manager 103 can compute application-specific familiarity/safety scores and restrict the list of applications that are visible/available to the user.

In another embodiment, the security policy manager 103 can use the system-level familiarity/safety score to modify or adjust the appearance of the user interface (UI) or UI elements by filtering out sensitive applications from the user's view based, at least in part, on the selected security policy. For example, in 'unsafe' contexts, the corporate e-mail application might be hidden from the user's view. Applications can also restrict or modify application-specific actions depending on application specific familiarity/safety scores. For example, when the device is outside the "work" context, the e-mail application may choose to show ordinary e-mails, but discourage the user from reading (or refuse to let him read) e-mails that are labeled as "confidential".

Figure 3D:
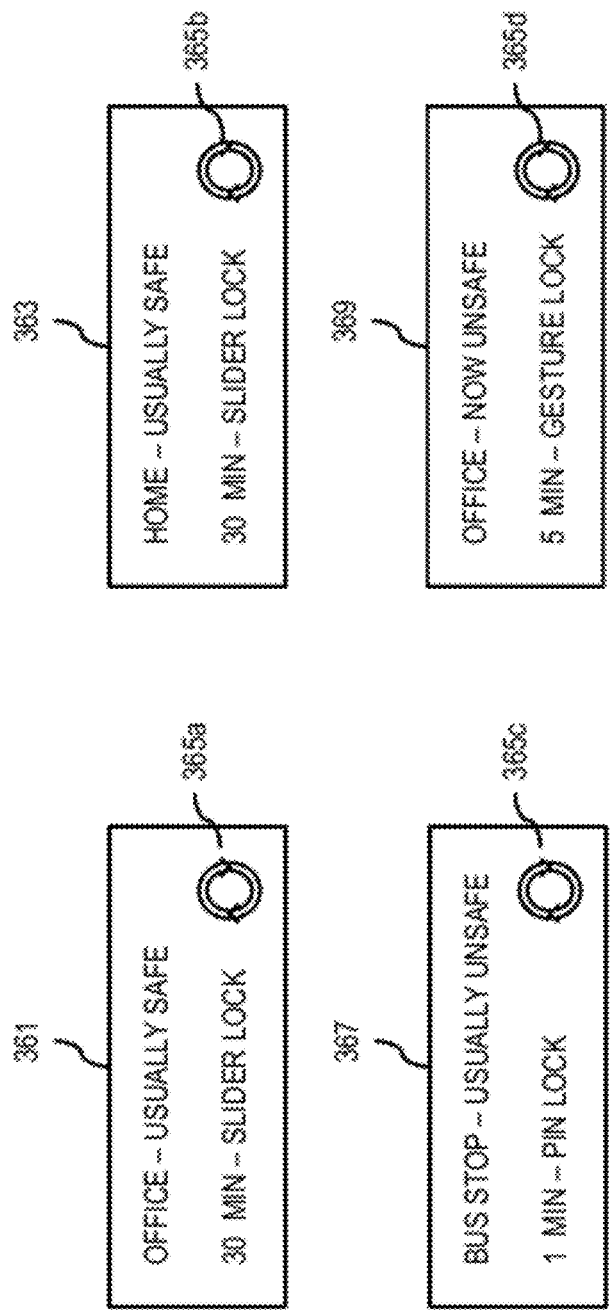
Figure 3E:
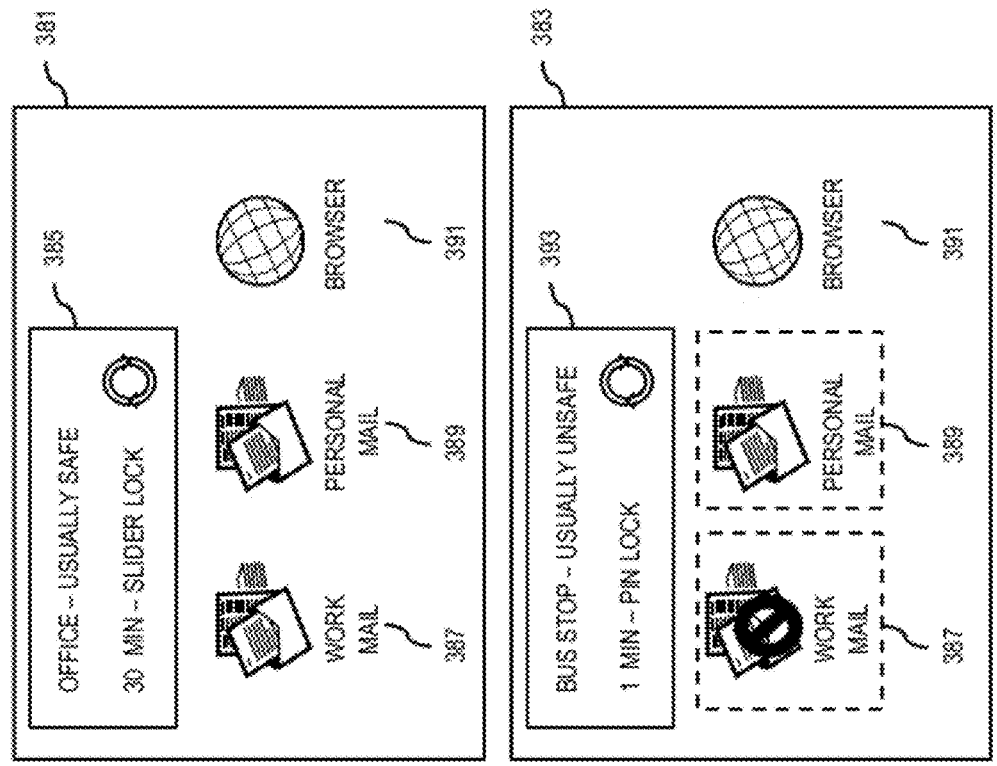

FIGS. 3C-3E are diagrams of user interfaces used in the process of FIG. 3A, according to various embodiments. As shown in FIG. 3C, UI 341 depicts a screenshot of a potential user interface that could be used for providing user input about the safety of a context. The UI 341 displays the current context and determined safety and provides for a selection button 343 (labeled "Office (Current)" in the figure) for selecting the context to process. UI 345 shows an example of a list of contexts that this selection button 343 can provide. The selection button 343 also provides an input text field for the user to enter a name for the currently processed context. In addition, UI 341 includes an element 347 for showing the overall familiarity score of the current context. The UI 341 also provides a selection button 349 for the user to specify input about the current safety level of the context (labeled "Now unsafe" in the figure). An example of the selection options that this button provides is shown in UI 351.

As shown in UI 351, the "Default" option means that the user has not specified any additional information about the safety level of the context. The safety level will therefore be calculated only based on the context observations determined by the security policy manager 103, and user input is not taken into account. In addition, the UI 351 indicates a selection 353 made by the user to specify a safety level of "Usually safe" for the current context. When this option is selected, the $cfam_{agg}$ value for this context is permanently set to a value above $\beta$.

If the user selects a value of "usually unsafe" the $cfam_{agg}$ value for this context is permanently set to a value below $\beta$.

If the user selects "Now safe", the device familiarity boosting described above is applied to the devices in the current context, so that the $cfam_{inst}$ value of the current context rises above $\alpha$. Optionally, also the $cfam_{agg}$ value of the context can be set to a value above $\beta$.

If the user selects "Now unsafe" the device familiarity values of the devices in the current context can be "de-boosted" as described above, so that the $cfam_{inst}$ value of the current context falls below $\alpha$. Optionally, also the $cfam_{agg}$ value of the context can be set to a value below $\beta$.

In another embodiment of the invention, the setting "usually safe" may set the safety level of the context permanently to this level, and the setting "usually unsafe" permanently to this level.

FIG. 3D depicts examples of UI widgets for including different contexts and their determined safety scores or levels. As shown, widget 361 is associated with an "Office" context and widget 363 is associated with a "Home" context. In both contexts, the safety level is "usually safe", the lock timeout is 30 minutes and a slider lock will be used according to a selected security policy (see the discussion of the selection of the locking mechanism with respect to FIG. 4 below). In addition, each widget includes a refresh option (e.g., refresh options 365a-365d) to initiate reevaluation of the safety level at a particular instance or aggregation of the instance.

Widget 367 shows an unfamiliar context "Bus stop". Accordingly, the safety level is indicated as "usually unsafe", the lock timeout is one minute, and a PIN-based lock will be used. Widget 369 shows an exceptional situation in a familiar context "Office". This context is usually familiar (i.e. $cfam_{agg}$ ("Office")>$\beta$), but the current context familiarity value is low ($cfam_{inst}$("Office")<$\alpha$), e.g., because there are many visitors in the office with unfamiliar mobile devices. The widget 369 indicates, that the safety level is "now unsafe", the locking timeout is five minutes, and that a gesture-based lock (e.g., a Draw-a-secret (DAS) unlocking mechanism) will be used.

FIG. 3E illustrates example Home Screen or Desktop UI's 381 and 383 for the use of finer-grained application/safety scores. For example, the UI 381 is provided in an office context 385 where the system-wide safety level is "usually safe". Under this safety level, all applications (e.g., applications 387-391) are available for use and are indicated as safe to use. However, in the case of UI 383 where the context 393 is a bus stop that is rated as "usually unsafe", the security policy manager 103 applies different security scores and/or policies based on an application-by-application basis. In this case, the UI 383 can visually indicate whether each of the applications can be used. For example, it may still be reasonable to use some non-critical applications (e.g., browser 395) without compromising the safety of the information accessed by the non-critical applications. Accordingly, no restriction is placed on use of the browser 391. In one embodiment, other non-critical applications (e.g., personal mail 389) could be used, but a warning to the user is first provided and confirmed by the user before use. As shown, this restriction on the personal mail 389 is indicated by a border. In another embodiment, critical applications (e.g., work mail 387) are disabled under the context. This restriction is indicated, for instance, by a border and a cross overlaid on the application's icon. It is contemplated that the system 100 can use any indicator (e.g., color, shading, graphics, audio, animation, haptics, etc.) to indicate application restrictions.

Figure 4:
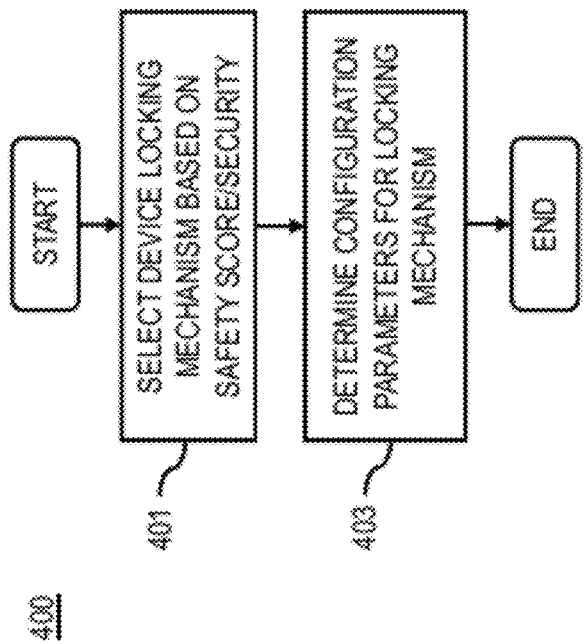
FIG. 4 is a flowchart of a process for applying a security policy to select a locking mechanism for a device, according to one embodiment.

FIG. 4 is a flowchart of a process for applying a security policy to select a locking mechanism for a device, according to one embodiment. In one embodiment, the security policy manager 103 performs the process 400 and is implemented in, for instance, a chip set including a processor and a memory as shown FIG. 11. As such, the security manager 103 provide means for accomplishing various parts of the process 400 as well as means for accomplishing other processes in conjunction with other components. In the example of FIG. 4, the security policy relates to a locking mechanism that is to be used at the UE 101. As discussed previously, the safety score determined by the security platform manager 103 can be used to adjust selection of the locking mechanism. In other words, the security policy manager 103 selects the locking mechanism for the UE 101 based, at least in part, on the safety score, the security policy, or a combination thereof (step 401).

In addition, the security policy manager 103 can also determine one or more configuration parameters of the locking mechanism based, at least in part, on the safety score, the security policy, or a combination thereof (step 403). For example, the configuration parameters may include the length of the time-out period of the automatic locking, and the 'depth' of the locking mechanism. In 'safe' environments the time-out period for the automatic locking can be adjusted to be very long, and the locking mechanism only 'shallow', i.e. only a short passcode is required for un-locking. In another scenario, a locking scheme may be chosen, which does not ask the user to input a locking code, but, e.g., draw a gesture on the device's screen. In environments that are not 'safe', the time-out is set to be short and the locking mechanism is 'deep', i.e. a long passcode is required for un-locking the device.

Figure 5:
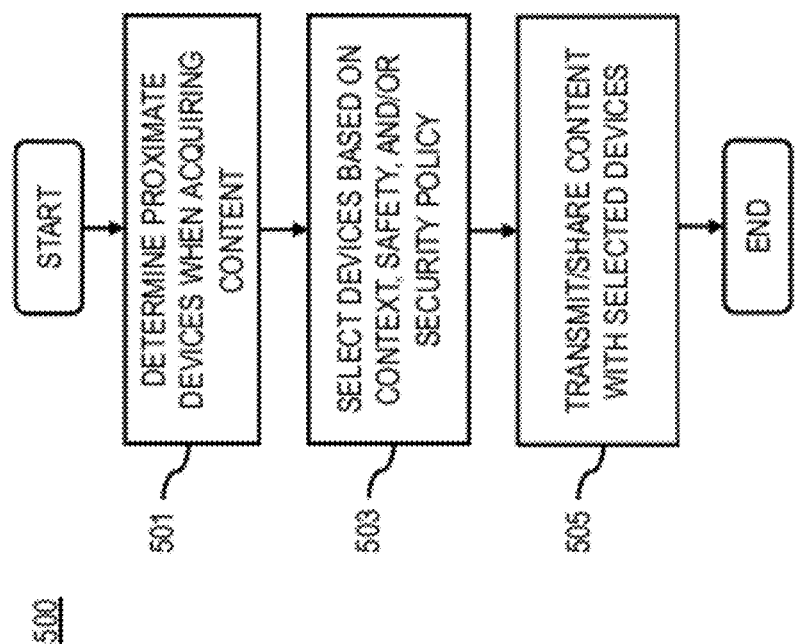
FIG. 5 is a flowchart of a process for applying a security policy to share or transmit content, according to one embodiment.

FIG. 5 is a flowchart of a process for applying a security policy to share or transmit content, according to one embodiment. In one embodiment, the security policy manager 103 performs the process 500 and is implemented in, for instance, a chip set including a processor and a memory as shown FIG. 11. As such, the security manager 103 provide means for accomplishing various parts of the process 500 as well as means for accomplishing other processes in conjunction with other components. In the example of FIG. 4, the security policy relates to sharing content acquired at a particular place. In one embodiment, when the content is acquired at the UE 101 (e.g., when a picture or video is taken on the UE 101), the security policy manager 103 can sense or otherwise determine one or more UEs 101 that are within proximity (e.g., a predetermined distance) of the place where the content was acquired (step 501). In addition or alternatively, the security policy manager 103 can determine the proximate devices at the time the content is shared as opposed to when the content is captured. In other words, the UE 101 can capture the content at a one time, and then the security policy manager 103 can determine possible candidates for sharing the content at a later time. For example, in one sample use case, a user may meet a friend and may want to share pictures that the user and friend took together when vacationing the previous summer.

In step 503, the security policy manager 103 selects devices from the identified proximate devices for sharing the content. In one embodiment, for each sensed device d, the familiarity score, e.g., $dfam_{Bluetooth}(d)$ can be calculated and devices that have a familiarity score above a specified threshold familiarity_thr can be included on a default list of devices to share the content with. The motivation for this is that any familiar devices that are present when the content is captured and/or shared are likely to be related to the user and/or relevant to the situation, e.g., participating in the same event. The default list of sharing targets can then be saved as metadata attached to the content and be taken into use, if the user decides to share the content. The user can then either accept or modify the list. Then, the security policy manager 103 can determine to transmit the content to the selected one or more of the devices based, at least in part, on the context information, the safety score, the security policy, or a combination thereof (step 505). In addition or alternatively, the security policy manager 103 may provide access rights to the selected devices, so that the devices may later access the content on the user's website, social networking site, and/or other similar content sharing service.

Figure 6:
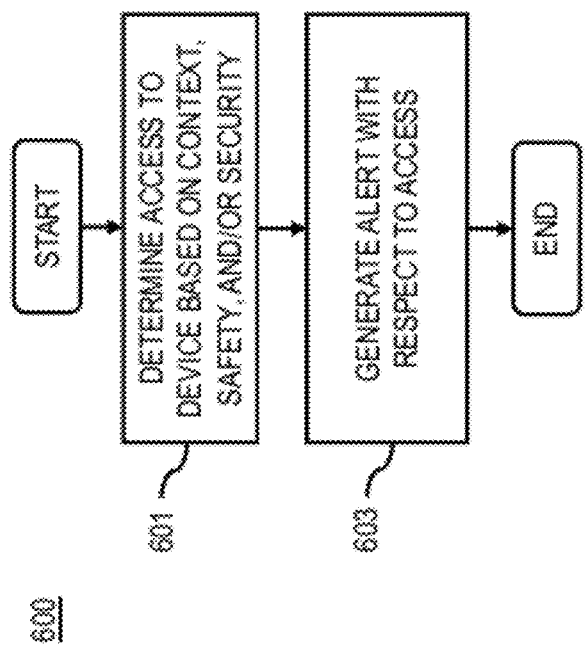
FIG. 6 is a flowchart of a process for applying a security policy to determine access to a device, according to one embodiment.

FIG. 6 is a flowchart of a process for applying a security policy to determine access to a device, according to one embodiment. In one embodiment, the security policy manager 103 performs the process 600 and is implemented in, for instance, a chip set including a processor and a memory as shown FIG. 11. As such, the security manager 103 provide means for accomplishing various parts of the process 600 as well as means for accomplishing other processes in conjunction with other components. The example of FIG. 6 relates to a security policy for restricting access to content, features, functions, applications, and/or the like at the UE 101. As discussed previously, some contexts and/or locations are inappropriate for consuming some kinds of content. Accordingly, at step 601, the security policy manager 103 determines access to content, applications, features, functions, or a combination thereof of the UE 101 based, at least in part, on the safety score, the security policy, the context information, or a combination thereof.

In one embodiment, familiarity and/or trustworthiness (e.g., the safety score) can be used to assist a user in the safe handling of content. For example, when the user requests to open a document marked "confidential", the security policy manager 103 may evaluate the safety score and then restrict access to the content based on the score and/or other context information. For example, if the user is at the office, the security policy manager 103 may enable the user to open the document on the UE 101 without authentication because the office in this example is a familiar (e.g. visited every week day), safe, and stable environment. If, however, the user attempts to open the same confidential document while on the subway, the security policy manager 103 may detect that the environment or location is unfamiliar (e.g., not previously visited), crowded (e.g., with unfamiliar users or devices), and volatile (e.g., the detected proximate devices changed rapidly). Accordingly, the security policy manager 103 may require more stringent authentication before enabling access to the document. In some cases, the security manager 103 may determine to generate an alert to the user with respect to access to the content based, at least in part, on the safety score, the security policy, the context information, or a combination thereof (step 603).

In this way, the security policy manager 103 may (in addition or as an alternative) present the alert to the user before enabling access. For example, if the user requests to open the confidential document in a library, the security policy manager 103 may detect that the library is unfamiliar, sparse, and stable. The security policy manager 103 may display an alert regarding the unfamiliar location, but may nonetheless enable access because the other factors show that the location is spare and stable.

Figure 7:
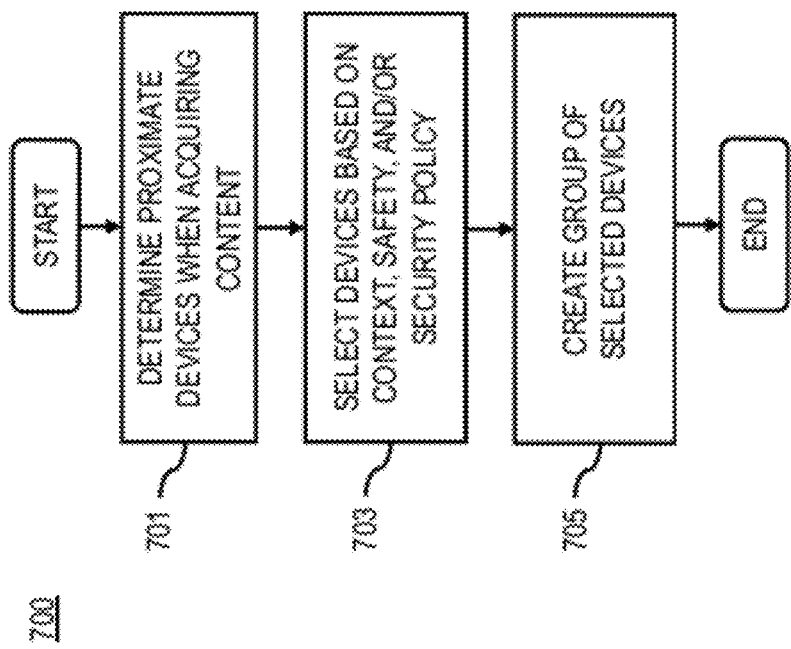
FIG. 7 is a flowchart of a process for applying a security policy to create a group, according to one embodiment.

FIG. 7 is a flowchart of a process for applying a security policy to create a group, according to one embodiment. In one embodiment, the security policy manager 103 performs the process 700 and is implemented in, for instance, a chip set including a processor and a memory as shown FIG. 11. As such, the security manager 103 provide means for accomplishing various parts of the process 700 as well as means for accomplishing other processes in conjunction with other components. At step 701, the security policy manager 103 determines one or more devices that are within proximity of a place associated with the UE 101. As part of the determining step, the security policy manager 103 determines the safety score including the familiarity component of the detected devices. In one embodiment, the use of the familiarity of the detected devices, their associated users, and/or the place can be used to automatically infer groupings for the detected devices or people.

Accordingly, the security policy manager 103 selects one or more of the devices based, at least in part, on the context information, the safety score, the familiarity, and/or the security policy (step 703), and then determines to create one or more groups (e.g., contact list groups) comprising the selected devices (step 705). By way of example, the security policy manager 103 can group those devices or users that appear frequently at a familiar place into a context-dependent group. For example, familiar persons appearing frequently in the familiar place "home" can be grouped together and labeled as family members in the same group. Similarly, familiar devices or persons appearing frequently in the familiar place "office" can be grouped together and labeled as colleagues in the same group.

In certain embodiments, the automatically formed groups can also be used in conjunction with the access control process described above. For example, the default content sharing target can include both detected persons as well as persons in the same group as the detected persons. For instance, if the user's spouse is in a picture, the group "family" may also be suggested as targets for sharing the picture.

Figure 8A:
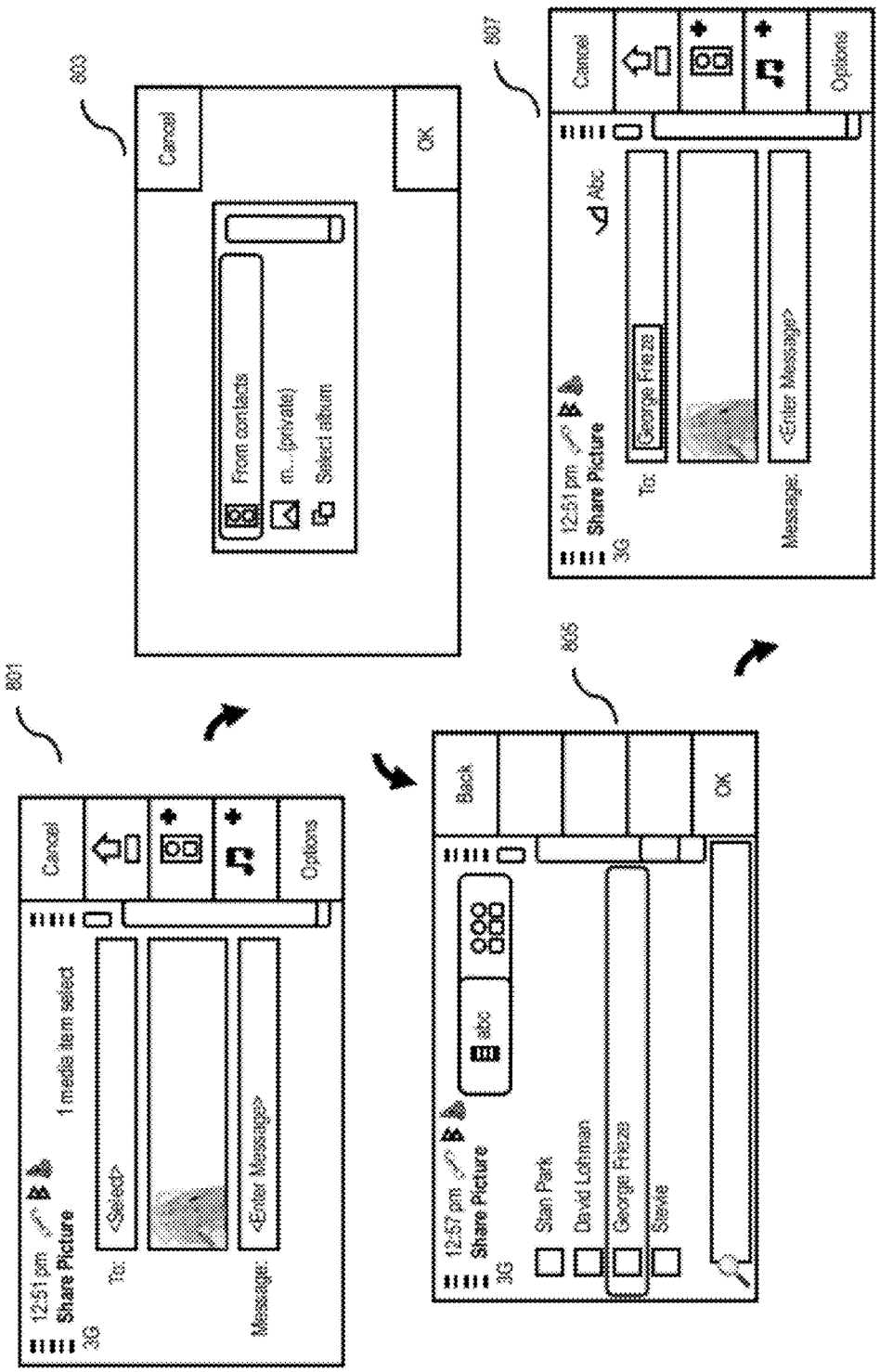
Figure 8B:
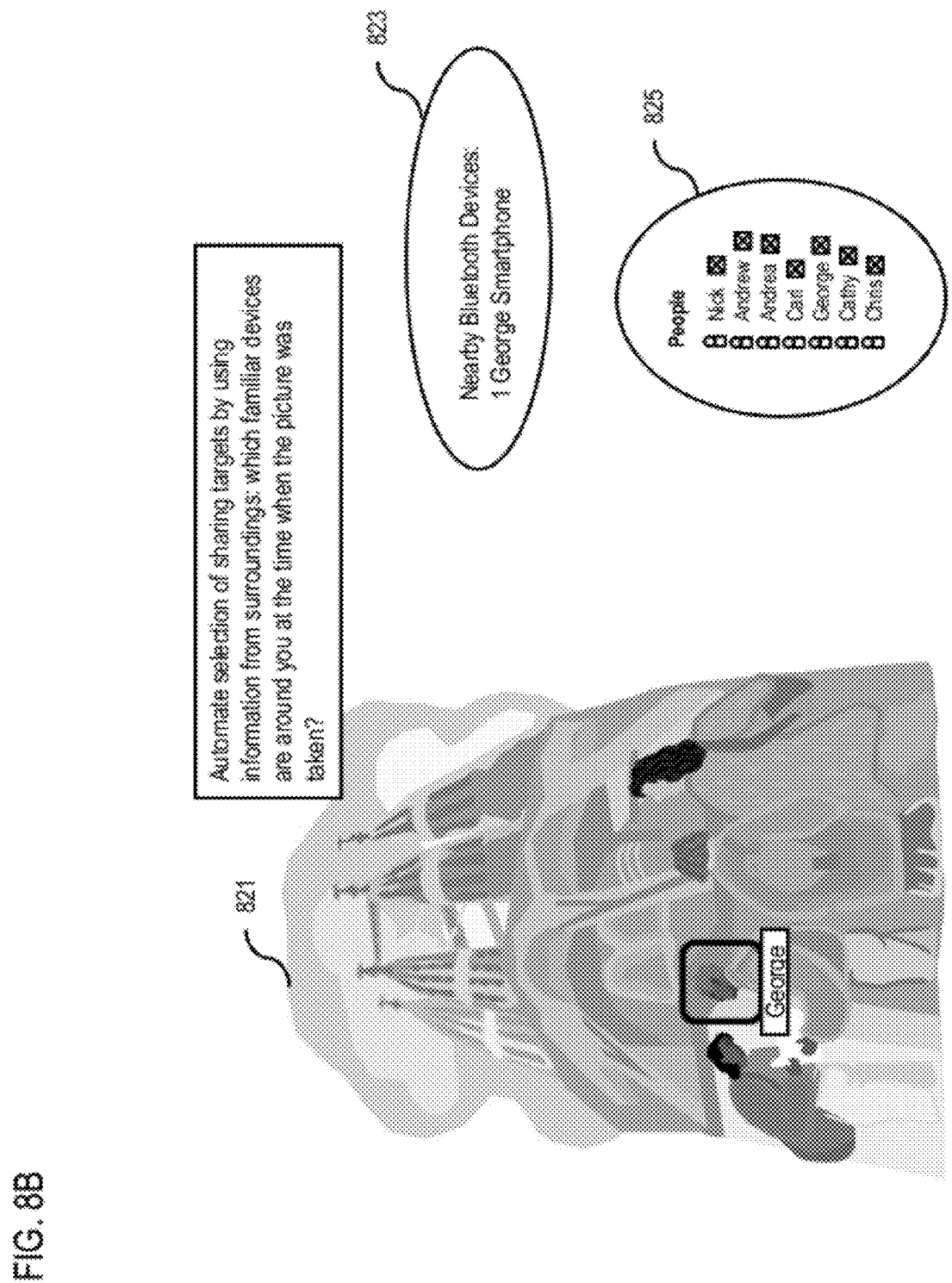

FIGS. 8A-8C are diagrams of a sample use case for applying a security policy to share content, according to various embodiments. FIG. 8A depicts a sequence of user interface screens for selecting a targets for content sharing using a convention approach (e.g., manually selecting the recipients of the content). In user interface 801, the user has selected a picture to share. Using the conventional manual approach, the user selects an option to enter the contact list as shown in user interface 803. On viewing the contact list in user interface 805, the user scrolls through the contact list and selects an target recipient. This target recipient is then added to the user interface 807 to initiate sharing.

FIGS. 8B and 8C depict that automatic security policy based approached described in processes of FIGS. 3-7. More specifically, FIG. 8B depicts the automatic selection of sharing targets by using information from the context or location at the time the picture 821 was taken. In this example, on capture the picture 821, the security policy manager 103 identifies nearby devices using, for instance, Bluetooth detection. In this case, one Bluetooth device was detected corresponding to one of the subjects in the picture. The detected Bluetooth device is provided in the detected list 823. In some embodiments, the security platform may also attempt to identify other subjects in the picture using, for instance, facial recognition technology as widely known in the art. The names of the recognized subjects are provided in the list 825. The list 825 provides additional verification of the user detected via Bluetooth. The detected list 823 and the list 825 can be stored as metadata associated with the picture 821 for later use.

As shown in FIG. 8C, when the user selects to share the picture 821 in the user interface 841, the security policy manager 103 and/or the picture application may access the metadata and automatically specify the detected target recipient. The target recipient is automatically selected and presented for user confirmation in the user interface 843.

Figure 9:
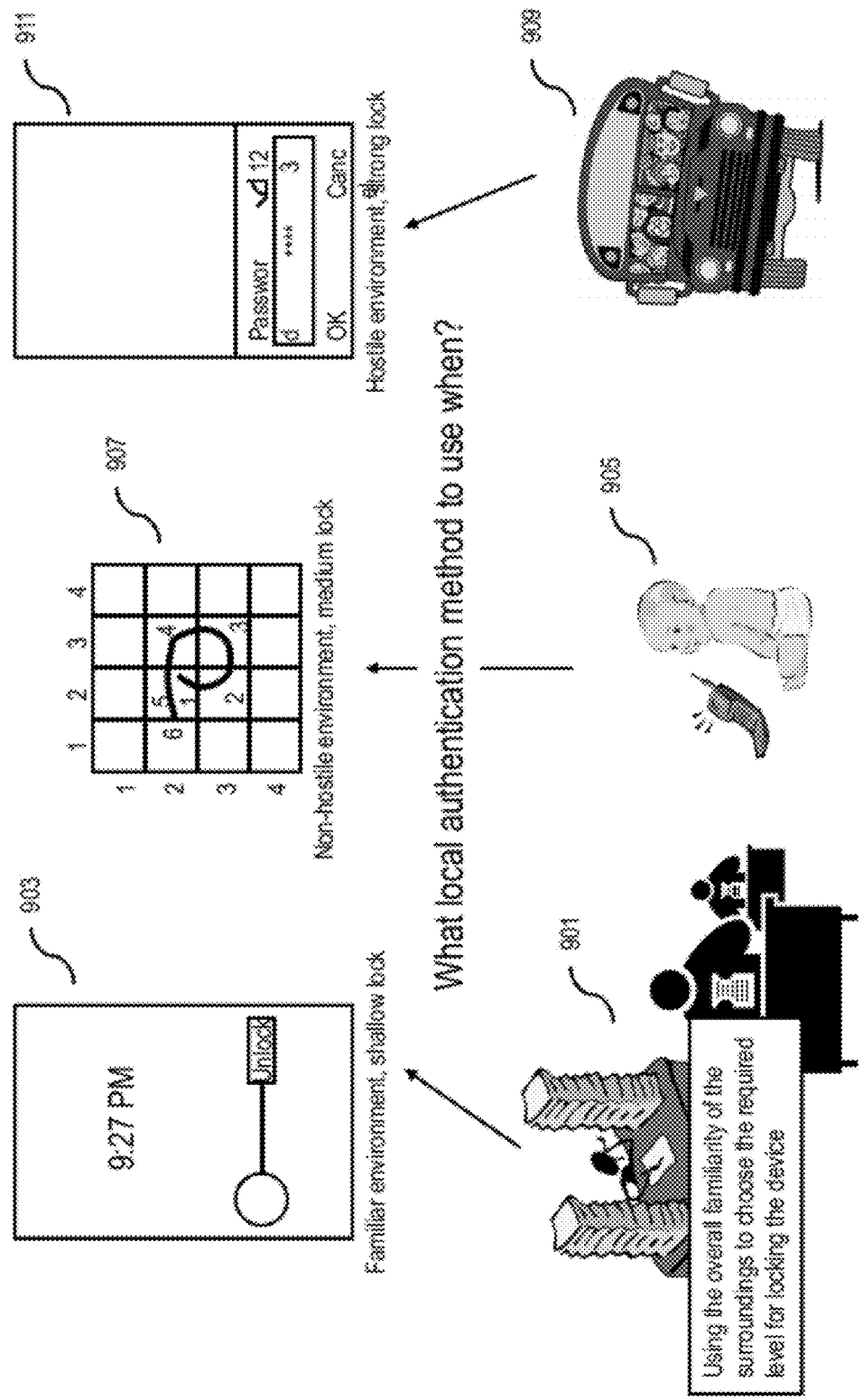
FIG. 9 is a diagram of a sample use case for applying a security policy to select a locking mechanism, according to one embodiment.

FIG. 9 is a diagram of a sample use case for applying a security policy to select a locking mechanism, according to one embodiment. As described previously, the security policy manager 103 can determine what type of locking mechanism or local authentication scheme to use based on context information associated with a place. Location 901 indicates that the user is in the user's typical office environment which the security policy manager 103 considers to be a familiar environment requiring minimal security. Accordingly, the security policy manager 103 selects a relatively "shallow" locking mechanism 903 (e.g., a simple sliding lock) that is minimally intrusive.

Location 905 indicates that the user is visiting a relative's house with a small child who likes to play with cell phones. The security policy manager 103 recognizes the context or location as non-hostile, but may require a medium lock 907 to avoid inadvertent unlocking by the child. In this case, the medium lock 907 is based on a more complex gesture (e.g., a swirling gesture) than the simple sliding gesture of the shallow lock 903.

The third location 909 indicates that the user is on a crowded public bus where the risk of losing the UE 101 is greater. Accordingly, the security policy manager 103 determines that the bus is a hostile environment that requires a strong lock 91. In this case the strong lock 911 is based on a complex passcode to reduce the possibility that even if the phone were stolen or lost, an unauthorized person would be able to access the information on the phone.

As shown in FIG. 9, the security policy manager 103 is able to dynamically and automatically change the locking mechanism of the UE 101 to reflect the risk posed by a specific location or context. In this way, the security policy manager 103 improve the user experience by requiring only the level of locking needed for a given context, thereby reducing the burden on the user. This means that in a safe location the user does not have to frequently unlock the device, resulting in bad user experience. As soon as the user leaves the safe place, e.g. leaves the office to commute home, the device notices this from the change in the context and determines that the device is in a less safe environment. It can then also shorten the lock time-out period, so that the user's confidential data are protected also in a case where the device might get stolen.

The approach described herein also advantageously enables a user's device to learn the typical context in specific points of interest of the user, like at home or in the office. Later, the familiarity of the context with regard to the recorded history may be used to draw conclusions of the safety of the location and adjust the device's security settings. As described, the system 100 can utilize available radio network information to assess the familiarity of a 'place'. This familiarity indication can be used to make security decisions (e.g. adjusting the locking policy) in an unobtrusive way, leading to a greatly improved user experience.

In some embodiment, to further improve user experience, the context sensitivity-based security decision making can be visualized or otherwise presented to the user. In addition, it is contemplated that in some embodiments, the security policy manager 103 can enable the user to easily revoke or modify any decisions made security policy manager 103. These 'user guidances' need to be taken into account in subsequent decision making.

In another embodiment, the context familiarity or safety score can be used for other applications. For example, many applications can distinguish relevant factors about the user's context. The familiarity of the current situation is one such factor that can provide valuable input to any context-sensitive applications. Examples of other applications include: (1) deciding whether it is safe to render certain types content in a given environment (e.g., warn the user when trying to open a document labeled CONFIDENTIAL while sitting in a cafe); and (2) deciding whether context information about the user's current situation can be shared to other users and at what accuracy (e.g., stopping automatic sharing of context information to other users when the user is in a highly familiar, highly trustworthy place like at home or at the office).

The processes described herein for selecting a security policy may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 10:
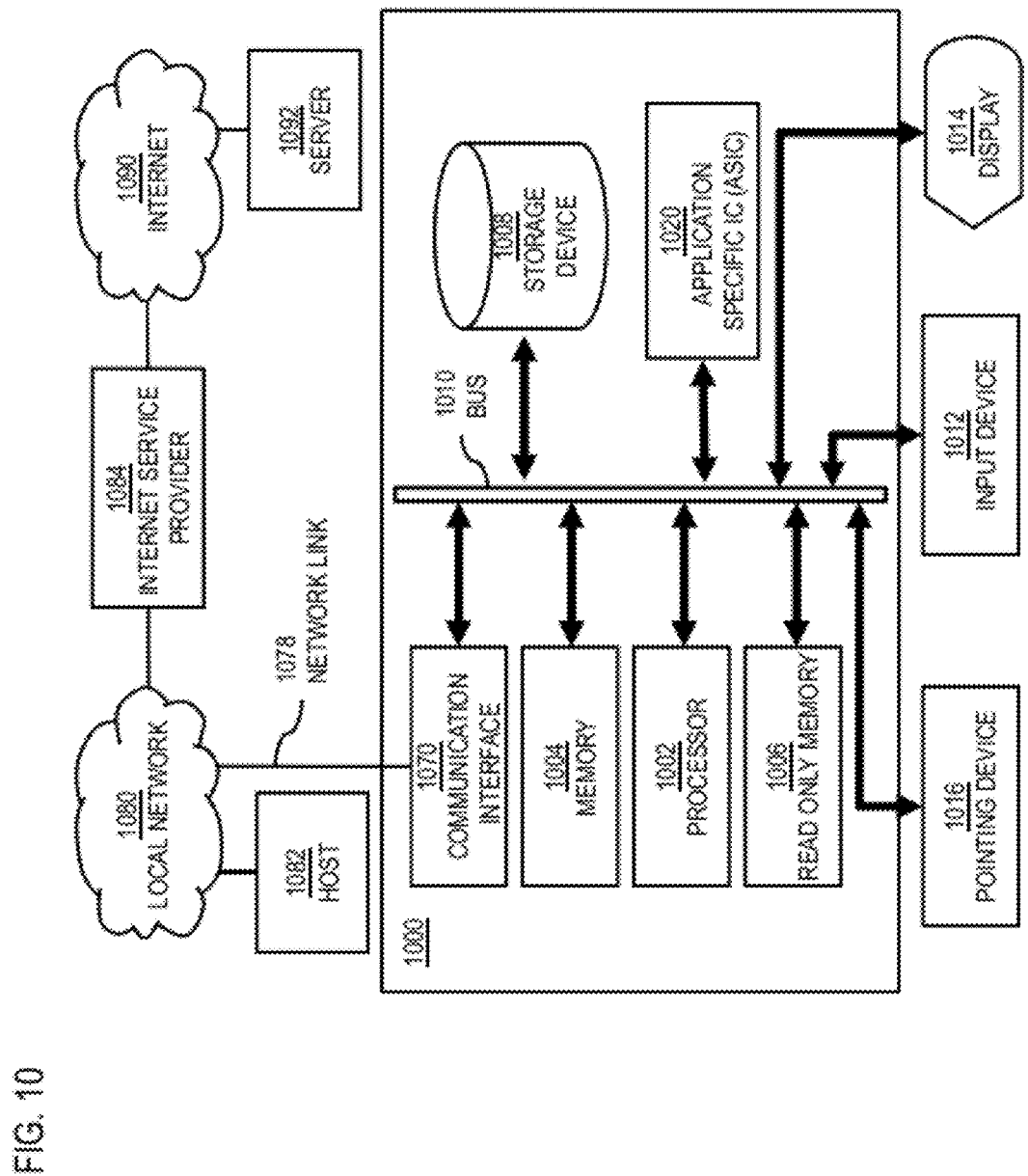
FIG. 10 is a diagram of hardware that can be used to implement an embodiment of the invention.

FIG. 10 illustrates a computer system 1000 upon which an embodiment of the invention may be implemented. Although computer system 1000 is depicted with respect to a particular device or equipment, it is contemplated that other devices or equipment (e.g., network elements, servers, etc.) within FIG. 10 can deploy the illustrated hardware and components of system 1000. Computer system 1000 is programmed (e.g., via computer program code or instructions) to select a security policy as described herein and includes a communication mechanism such as a bus 1010 for passing information between other internal and external components of the computer system 1000. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 1000, or a portion thereof, constitutes a means for performing one or more steps of selecting a security policy.

A bus 1010 includes one or more parallel conductors of information so that information is transferred quickly among devices coupled to the bus 1010. One or more processors 1002 for processing information are coupled with the bus 1010.

A processor (or multiple processors) 1002 performs a set of operations on information as specified by computer program code related to selecting a security policy. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1010 and placing information on the bus 1010. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1002, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 1000 also includes a memory 1004 coupled to bus 1010. The memory 1004, such as a random access memory (RAM) or other dynamic storage device, stores information including processor instructions for selecting a security policy. Dynamic memory allows information stored therein to be changed by the computer system 1000. RAM allows a unit of information stored at a location called a memory address to be stored and retrieved independently of information at neighboring addresses. The memory 1004 is also used by the processor 1002 to store temporary values during execution of processor instructions. The computer system 1000 also includes a read only memory (ROM) 1006 or other static storage device coupled to the bus 1010 for storing static information, including instructions, that is not changed by the computer system 1000. Some memory is composed of volatile storage that loses the information stored thereon when power is lost. Also coupled to bus 1010 is a non-volatile (persistent) storage device 1008, such as a magnetic disk, optical disk or flash card, for storing information, including instructions, that persists even when the computer system 1000 is turned off or otherwise loses power.

Information, including instructions for selecting a security policy, is provided to the bus 1010 for use by the processor from an external input device 1012, such as a keyboard containing alphanumeric keys operated by a human user, or a sensor. A sensor detects conditions in its vicinity and transforms those detections into physical expression compatible with the measurable phenomenon used to represent information in computer system 1000. Other external devices coupled to bus 1010, used primarily for interacting with humans, include a display device 1014, such as a cathode ray tube (CRT) or a liquid crystal display (LCD), or plasma screen or printer for presenting text or images, and a pointing device 1016, such as a mouse or a trackball or cursor direction keys, or motion sensor, for controlling a position of a small cursor image presented on the display 1014 and issuing commands associated with graphical elements presented on the display 1014. In some embodiments, for example, in embodiments in which the computer system 1000 performs all functions automatically without human input, one or more of external input device 1012, display device 1014 and pointing device 1016 is omitted.

In the illustrated embodiment, special purpose hardware, such as an application specific integrated circuit (ASIC) 1020, is coupled to bus 1010. The special purpose hardware is configured to perform operations not performed by processor 1002 quickly enough for special purposes. Examples of application specific ICs include graphics accelerator cards for generating images for display 1014, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1000 also includes one or more instances of a communications interface 1070 coupled to bus 1010. Communication interface 1070 provides a one-way or two-way communication coupling to a variety of external devices that operate with their own processors, such as printers, scanners and external disks. In general the coupling is with a network link 1078 that is connected to a local network 1080 to which a variety of external devices with their own processors are connected. For example, communication interface 1070 may be a parallel port or a serial port or a universal serial bus (USB) port on a personal computer. In some embodiments, communications interface 1070 is an integrated services digital network (ISDN) card or a digital subscriber line (DSL) card or a telephone modem that provides an information communication connection to a corresponding type of telephone line. In some embodiments, a communication interface 1070 is a cable modem that converts signals on bus 1010 into signals for a communication connection over a coaxial cable or into optical signals for a communication connection over a fiber optic cable. As another example, communications interface 1070 may be a local area network (LAN) card to provide a data communication connection to a compatible LAN, such as Ethernet. Wireless links may also be implemented. For wireless links, the communications interface 1070 sends or receives or both sends and receives electrical, acoustic or electromagnetic signals, including infrared and optical signals, that carry information streams, such as digital data. For example, in wireless handheld devices, such as mobile telephones like cell phones, the communications interface 1070 includes a radio band electromagnetic transmitter and receiver called a radio transceiver. In certain embodiments, the communications interface 1070 enables connection to the communication network 105 for selecting a security policy.

The term "computer-readable medium" as used herein refers to any medium that participates in providing information to processor 1002, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 1008. Volatile media include, for example, dynamic memory 1004. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 1020.

Network link 1078 typically provides information communication using transmission media through one or more networks to other devices that use or process the information. For example, network link 1078 may provide a connection through local network 1080 to a host computer 1082 or to equipment 1084 operated by an Internet Service Provider (ISP). ISP equipment 1084 in turn provides data communication services through the public, world-wide packet-switching communication network of networks now commonly referred to as the Internet 1090.

A computer called a server host 1092 connected to the Internet hosts a process that provides a service in response to information received over the Internet. For example, server host 1092 hosts a process that provides information representing video data for presentation at display 1014. It is contemplated that the components of system 1000 can be deployed in various configurations within other computer systems, e.g., host 1082 and server 1092.

At least some embodiments of the invention are related to the use of computer system 1000 for implementing some or all of the techniques described herein. According to one embodiment of the invention, those techniques are performed by computer system 1000 in response to processor 1002 executing one or more sequences of one or more processor instructions contained in memory 1004. Such instructions, also called computer instructions, software and program code, may be read into memory 1004 from another computer-readable medium such as storage device 1008 or network link 1078. Execution of the sequences of instructions contained in memory 1004 causes processor 1002 to perform one or more of the method steps described herein. In alternative embodiments, hardware, such as ASIC 1020, may be used in place of or in combination with software to implement the invention. Thus, embodiments of the invention are not limited to any specific combination of hardware and software, unless otherwise explicitly stated herein.

The signals transmitted over network link 1078 and other networks through communications interface 1070, carry information to and from computer system 1000. Computer system 1000 can send and receive information, including program code, through the networks 1080, 1090 among others, through network link 1078 and communications interface 1070. In an example using the Internet 1090, a server host 1092 transmits program code for a particular application, requested by a message sent from computer 1000, through Internet 1090, ISP equipment 1084, local network 1080 and communications interface 1070. The received code may be executed by processor 1002 as it is received, or may be stored in memory 1004 or in storage device 1008 or other non-volatile storage for later execution, or both. In this manner, computer system 1000 may obtain application program code in the form of signals on a carrier wave.

Various forms of computer readable media may be involved in carrying one or more sequence of instructions or data or both to processor 1002 for execution. For example, instructions and data may initially be carried on a magnetic disk of a remote computer such as host 1082. The remote computer loads the instructions and data into its dynamic memory and sends the instructions and data over a telephone line using a modem. A modem local to the computer system 1000 receives the instructions and data on a telephone line and uses an infra-red transmitter to convert the instructions and data to a signal on an infra-red carrier wave serving as the network link 1078. An infrared detector serving as communications interface 1070 receives the instructions and data carried in the infrared signal and places information representing the instructions and data onto bus 1010. Bus 1010 carries the information to memory 1004 from which processor 1002 retrieves and executes the instructions using some of the data sent with the instructions. The instructions and data received in memory 1004 may optionally be stored on storage device 1008, either before or after execution by the processor 1002.

FIG. 11 illustrates a chip set or chip 1100 upon which an embodiment of the invention may be implemented. Chip set 1100 is programmed to select a security policy as described herein and includes, for instance, the processor and memory components described with respect to FIG. 10 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 1100 can be implemented in a single chip. It is further contemplated that in certain embodiments the chip set or chip 1100 can be implemented as a single "system on a chip." It is further contemplated that in certain embodiments a separate ASIC would not be used, for example, and that all relevant functions as disclosed herein would be performed by a processor or processors. Chip set or chip 1100, or a portion thereof, constitutes a means for performing one or more steps of providing user interface navigation information associated with the availability of functions. Chip set or chip 1100, or a portion thereof, constitutes a means for performing one or more steps of selecting a security policy.

In one embodiment, the chip set or chip 1100 includes a communication mechanism such as a bus 1101 for passing information among the components of the chip set 1100. A processor 1103 has connectivity to the bus 1101 to execute instructions and process information stored in, for example, a memory 1105. The processor 1103 may include one or more processing cores with each core configured to perform independently. A multi-core processor enables multiprocessing within a single physical package. Examples of a multi-core processor include two, four, eight, or greater numbers of processing cores. Alternatively or in addition, the processor 1103 may include one or more microprocessors configured in tandem via the bus 1101 to enable independent execution of instructions, pipelining, and multithreading. The processor 1103 may also be accompanied with one or more specialized components to perform certain processing functions and tasks such as one or more digital signal processors (DSP) 1107, or one or more application-specific integrated circuits (ASIC) 1109. A DSP 1107 typically is configured to process real-world signals (e.g., sound) in real time independently of the processor 1103. Similarly, an ASIC 1109 can be configured to performed specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 1100 includes merely one or more processors and some software and/or firmware supporting and/or relating to and/or for the one or more processors.

The processor 1103 and accompanying components have connectivity to the memory 1105 via the bus 1101. The memory 1105 includes both dynamic memory (e.g., RAM, magnetic disk, writable optical disk, etc.) and static memory (e.g., ROM, CD-ROM, etc.) for storing executable instructions that when executed perform the inventive steps described herein to select a security policy. The memory 1105 also stores the data associated with or generated by the execution of the inventive steps.

Figure 12:
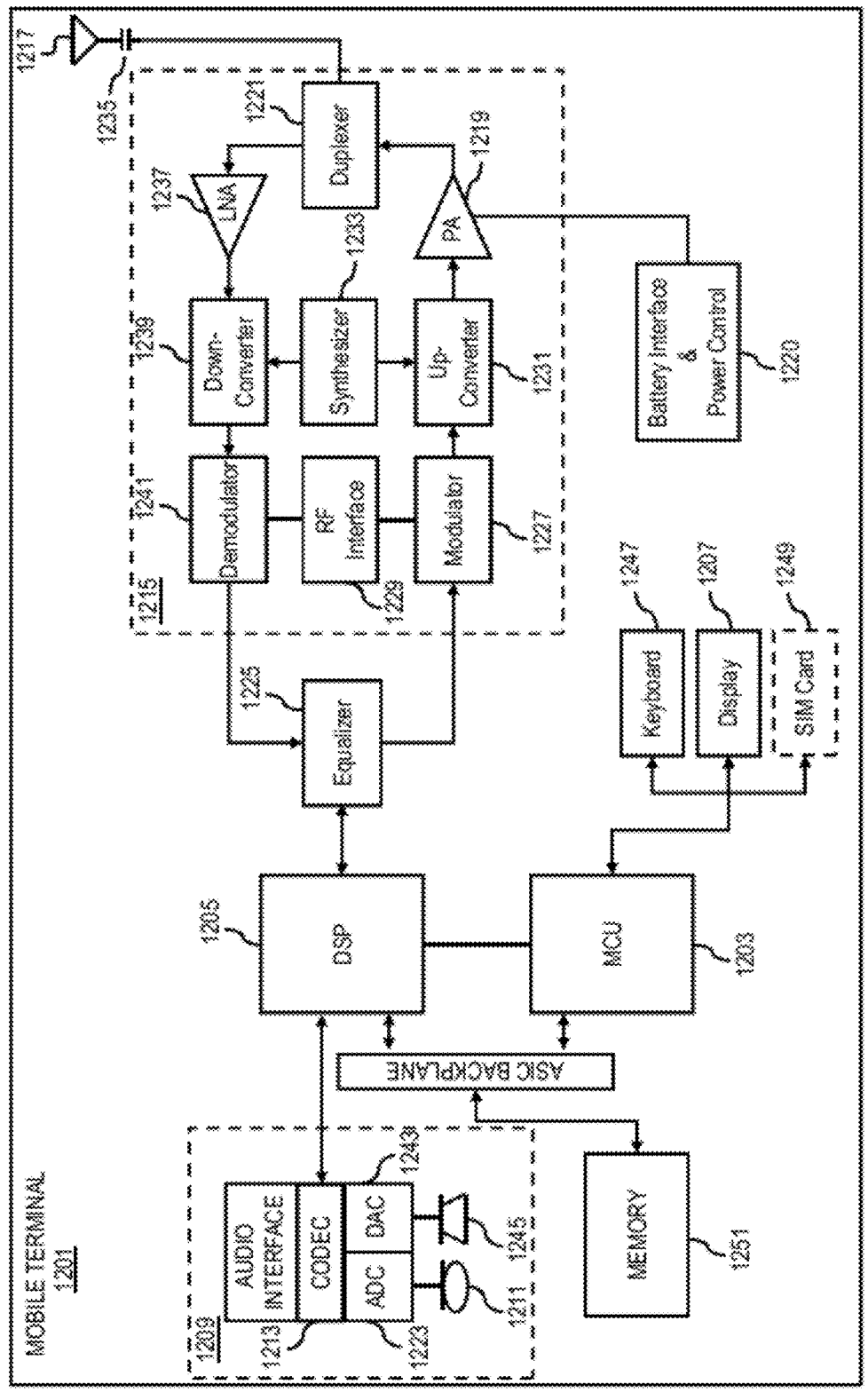
FIG. 12 is a diagram of a mobile terminal (e.g., handset) that can be used to implement an embodiment of the invention.

FIG. 12 is a diagram of exemplary components of a mobile terminal (e.g., handset) for communications, which is capable of operating in the system of FIG. 1, according to one embodiment. In some embodiments, mobile terminal 1201, or a portion thereof, constitutes a means for performing one or more steps of selecting a security policy. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1203, a Digital Signal Processor (DSP) 1205, and a receiver/transmitter unit including a microphone gain control unit and a speaker gain control unit. A main display unit 1207 provides a display to the user in support of various applications and mobile terminal functions that perform or support the steps of selecting a security policy. The display 1207 includes display circuitry configured to display at least a portion of a user interface of the mobile terminal (e.g., mobile telephone). Additionally, the display 1207 and display circuitry are configured to facilitate user control of at least some functions of the mobile terminal. An audio function circuitry 1209 includes a microphone 1211 and microphone amplifier that amplifies the speech signal output from the microphone 1211. The amplified speech signal output from the microphone 1211 is fed to a coder/decoder (CODEC) 1213.

A radio section 1215 amplifies power and converts frequency in order to communicate with a base station, which is included in a mobile communication system, via antenna 1217. The power amplifier (PA) 1219 and the transmitter/modulation circuitry are operationally responsive to the MCU 1203, with an output from the PA 1219 coupled to the duplexer 1221 or circulator or antenna switch, as known in the art. The PA 1219 also couples to a battery interface and power control unit 1220.

In use, a user of mobile terminal 1201 speaks into the microphone 1211 and his or her voice along with any detected background noise is converted into an analog voltage. The analog voltage is then converted into a digital signal through the Analog to Digital Converter (ADC) 1223. The control unit 1203 routes the digital signal into the DSP 1205 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like.

The encoded signals are then routed to an equalizer 1225 for compensation of any frequency-dependent impairments that occur during transmission though the air such as phase and amplitude distortion. After equalizing the bit stream, the modulator 1227 combines the signal with a RF signal generated in the RF interface 1229. The modulator 1227 generates a sine wave by way of frequency or phase modulation. In order to prepare the signal for transmission, an up-converter 1231 combines the sine wave output from the modulator 1227 with another sine wave generated by a synthesizer 1233 to achieve the desired frequency of transmission. The signal is then sent through a PA 1219 to increase the signal to an appropriate power level. In practical systems, the PA 1219 acts as a variable gain amplifier whose gain is controlled by the DSP 1205 from information received from a network base station. The signal is then filtered within the duplexer 1221 and optionally sent to an antenna coupler 1235 to match impedances to provide maximum power transfer. Finally, the signal is transmitted via antenna 1217 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile terminal 1201 are received via antenna 1217 and immediately amplified by a low noise amplifier (LNA) 1237. A down-converter 1239 lowers the carrier frequency while the demodulator 1241 strips away the RF leaving only a digital bit stream. The signal then goes through the equalizer 1225 and is processed by the DSP 1205. A Digital to Analog Converter (DAC) 1243 converts the signal and the resulting output is transmitted to the user through the speaker 1245, all under control of a Main Control Unit (MCU) 1203—which can be implemented as a Central Processing Unit (CPU) (not shown).

The MCU 1203 receives various signals including input signals from the keyboard 1247. The keyboard 1247 and/or the MCU 1203 in combination with other user input components (e.g., the microphone 1211) comprise a user interface circuitry for managing user input. The MCU 1203 runs a user interface software to facilitate user control of at least some functions of the mobile terminal 1201 to select a security policy. The MCU 1203 also delivers a display command and a switch command to the display 1207 and to the speech output switching controller, respectively. Further, the MCU 1203 exchanges information with the DSP 1205 and can access an optionally incorporated SIM card 1249 and a memory 1251. In addition, the MCU 1203 executes various control functions required of the terminal. The DSP 1205 may, depending upon the implementation, perform any of a variety of conventional digital processing functions on the voice signals. Additionally, DSP 1205 determines the background noise level of the local environment from the signals detected by microphone 1211 and sets the gain of microphone 1211 to a level selected to compensate for the natural tendency of the user of the mobile terminal 1201.

The CODEC 1213 includes the ADC 1223 and DAC 1243. The memory 1251 stores various data including call incoming tone data and is capable of storing other data including music data received via, e.g., the global Internet. The software module could reside in RAM memory, flash memory, registers, or any other form of writable storage medium known in the art. The memory device 1251 may be, but not limited to, a single memory, CD, DVD, ROM, RAM, EEPROM, optical storage, or any other non-volatile storage medium capable of storing digital data.

An optionally incorporated SIM card 1249 carries, for instance, important information, such as the cellular phone number, the carrier supplying service, subscription details, and security information. The SIM card 1249 serves primarily to identify the mobile terminal 1201 on a radio network. The card 1249 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
   determining one or more factors for adjusting a safety score associated with a device, wherein the safety score is based, at least in part, on a context associated with the device;
   determining one or more familiarity parameters, one or more trust parameters, or a combination thereof of respective one or more other devices associated with the context based, at least in part, on occurrence information of the respective one or more other devices within the context, wherein the occurrence information represents at least one of the one or more factors;
   processing and/or facilitating a processing of the one or more factors and the safety score, by a processor, to calculate an adjusted safety score based, at least in part, on adjusting the one or more familiarity parameters, the one or more trust parameters, or a combination thereof according to the one or more factors; and
   causing, at least in part, a selection of a security policy based, at least in part, on the adjusted safety score.

2. A method of claim 1, further comprising:
   causing, at least in part, a monitoring of the occurrence information; and
   processing and/or facilitating a processing of the occurrence information to adjust the one or more familiarity parameters, the one or more trust parameters, the adjusted safety score, or a combination thereof.

3. A method of claim 2, wherein the adjustment of the one or more familiarity parameters, the one or more trust parameters, the adjusted safety score, or a combination thereof is a reduction if there is decreased occurrence information with respect to at least one of the one or more other devices.

4. A method of claim 2, wherein the adjustment of the one or more familiarity parameters, the one or more trust parameters, the adjusted safety score, or a combination thereof is an increase if there is increased occurrence information with respect to at least one of the one or more other devices.

5. A method of claim 2, wherein the adjustment of the one or more familiarity parameters, the one or more trust parameters, the adjusted safety score, or a combination thereof is processed continuously, periodically, on demand, or a combination thereof.

6. A method of claim 2, further comprising:
receiving an input for specifying a value or an adjustment parameter of at least one of the one or more familiarity parameters, the one or more trust parameters, or a combination thereof.

7. A method of claim 1, further comprising:
receiving an input for specifying a perceived safety level of the context,
wherein the perceived safety level is at least one of the factors.

8. A method of claim 1, wherein the one or more factors, the safety score, the adjusted safety score, or a combination thereof are based, at least in part, on an instant observation or an aggregate observation of the context.

9. A method of claim 1, wherein the safety score, the adjusted safety score, or a combination thereof is specific to one or more applications, one or more processes, one or more services, or a combination thereof associated with the device.

10. A method of claim 1, further comprising:
processing and/or facilitating a processing of the safety score, the adjusted safety score, the security policy, or a combination thereof to determining an availability of (a) one or more applications, (b) one or more processes, (c) one or more services, and/or (d) one or more user interface elements associated with the one or more applications, one or more processes, one or more services, or a combination thereof.

11. A method of claim 1, wherein the one or more factors, the safety score, the adjusted safety score, the security policy, or a combination thereof are associated with a group of devices.

12. An apparatus comprising:
at least one processor; and
at least one memory including computer program code for one or more programs,
the at least one memory and the computer program code configured to, with the at least one processor, cause the apparatus to perform at least the following,
determine one or more factors for adjusting a safety score associated with a device, wherein the safety score is based, at least in part, on a context associated with the device;
determine one or more familiarity parameters, one or more trust parameters, or a combination thereof of respective one or more other devices associated with the context based, at least in part, on occurrence information of the respective one or more other devices within the context, wherein the occurrence information represents at least one of the one or more factors;
process and/or facilitate a processing of the one or more factors and the safety score to calculate an adjusted safety score based, at least in part, on adjusting the one or more familiarity parameters, the one or more trust parameters, or a combination thereof according to the one or more factors; and
determine to select a security policy based, at least in part, on the adjusted safety score.

13. An apparatus of claim 12, wherein the apparatus is further caused to:
determine to cause, at least in part, monitoring of the occurrence information; and
process and/or facilitate a processing of the occurrence information to adjust the one or more familiarity parameters, the one or more trust parameters, the adjusted safety score, or a combination thereof.

14. An apparatus of claim 13, wherein the adjustment of the one or more familiarity parameters, the one or more trust parameters, the adjusted safety score, or a combination thereof is a reduction if there is decreased occurrence information with respect to at least one of the one or more other devices.

15. An apparatus of claim 13, wherein the adjustment of the one or more familiarity parameters, the one or more trust parameters, the adjusted safety score, or a combination thereof is an increase if there is increased occurrence information with respect to at least one of the one or more other devices.

16. An apparatus of claim 12, wherein the apparatus is further caused to:
receive an input for specifying a perceived safety level of the context,
wherein the perceived safety level is at least one of the factors.

17. An apparatus of claim 12, wherein the safety score, the adjusted safety score, or a combination thereof is specific to one or more applications, one or more processes, one or more services, or a combination thereof associated with the device.

18. An apparatus of claim 12, wherein the apparatus is further caused to:
process and/or facilitate a processing of the safety score, the adjusted safety score, the security policy, or a combination thereof to determining an availability of (a) one or more applications, (b) one or more processes, (c) one or more services, and/or (d) one or more user interface elements associated with the one or more applications, one or more processes, one or more services, or a combination thereof.

* * * * *